United States Patent
Tang et al.

(10) Patent No.: US 8,441,745 B2
(45) Date of Patent: May 14, 2013

(54) OPTICAL LENS ASSEMBLY FOR IMAGE TAKING

(75) Inventors: Hsiang-Chi Tang, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 132 days.

(21) Appl. No.: 13/197,240

(22) Filed: Aug. 3, 2011

(65) Prior Publication Data

US 2012/0262804 A1 Oct. 18, 2012

(30) Foreign Application Priority Data

Apr. 15, 2011 (TW) .............................. 100113275 A

(51) Int. Cl.
 *G02B 3/02* (2006.01)
(52) U.S. Cl.
 USPC .......................................... 359/717; 359/708
(58) Field of Classification Search .................. 359/708, 359/717
See application file for complete search history.

(56) References Cited

U.S. PATENT DOCUMENTS

| 7,365,920 | B2 | 4/2008 | Noda |
| 7,633,690 | B2 * | 12/2009 | Yasuhiko .................... 359/773 |
| 2011/0157453 | A1 * | 6/2011 | Chen et al. .................. 348/340 |

* cited by examiner

*Primary Examiner* — James Greece
(74) *Attorney, Agent, or Firm* — Morris Manning & Martin LLP; Tim Tingkang Xia, Esq.

(57) ABSTRACT

An optical lens assembly comprises, in order from an object side to an image side, a front lens group, a stop, and a rear lens group. The front lens group comprises a first lens element with negative refractive power having a concave object-side surface. The rear lens group comprises a second lens element with positive refractive power having a concave object-side surface and a convex image-side surface, a third lens element with positive refractive power, a fourth lens element with negative refractive power having a concave object-side surface and a convex image-side surface. At least one of two surfaces of the fourth lens element is aspheric. By adjusting the curvature radii of the object-side and the image-side surfaces of the first lens element and the focal lengths of the third lens element and the optical lens assembly, the length of the optical lens assembly is reduced, the aberration is corrected.

23 Claims, 16 Drawing Sheets

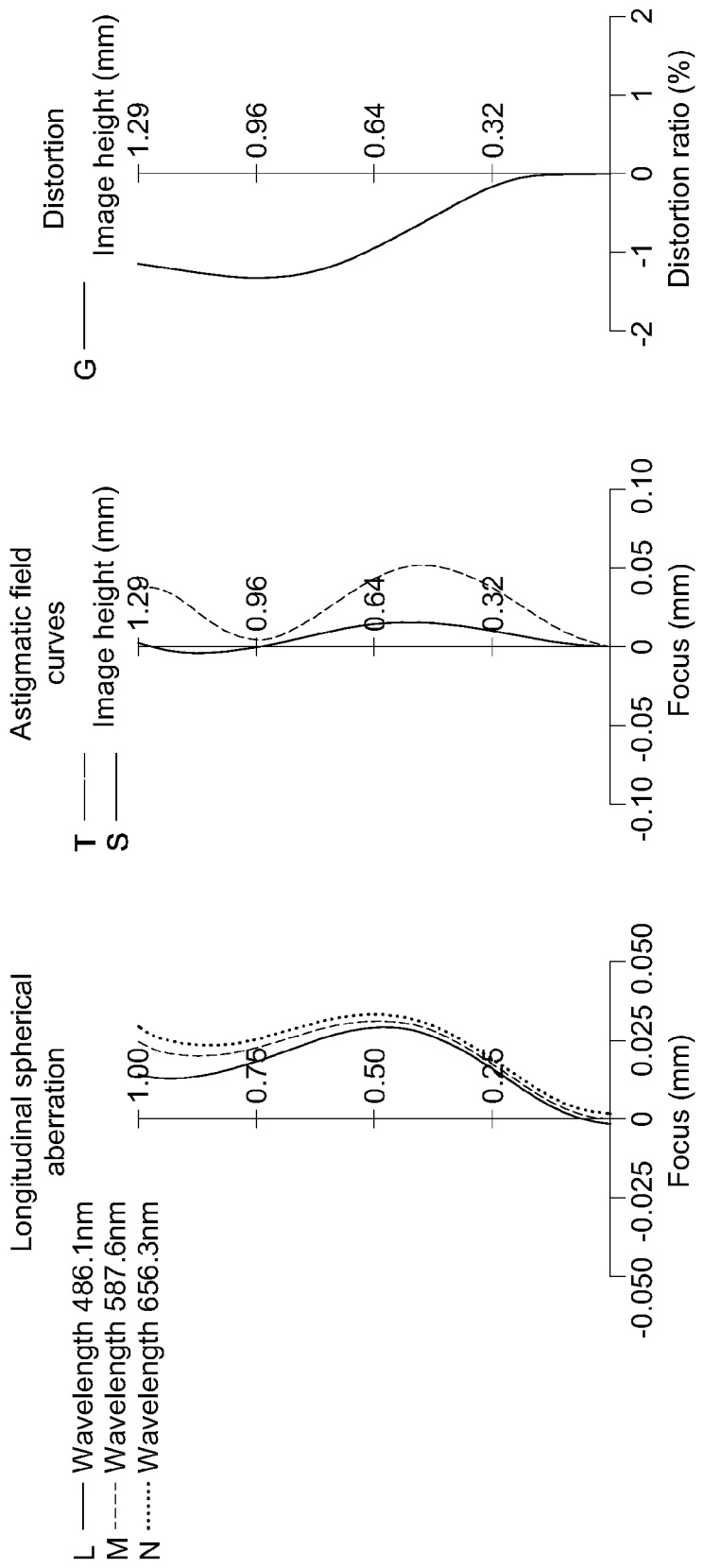

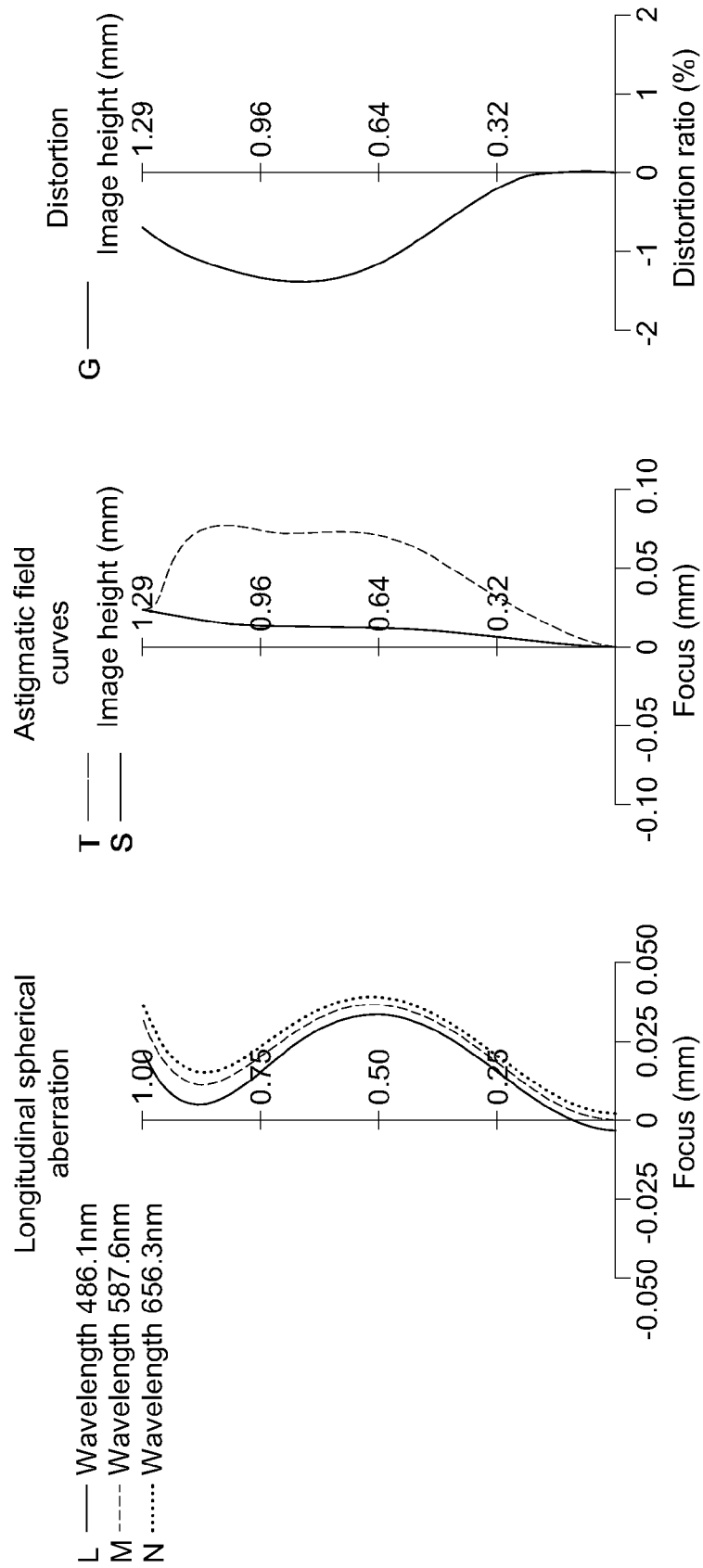

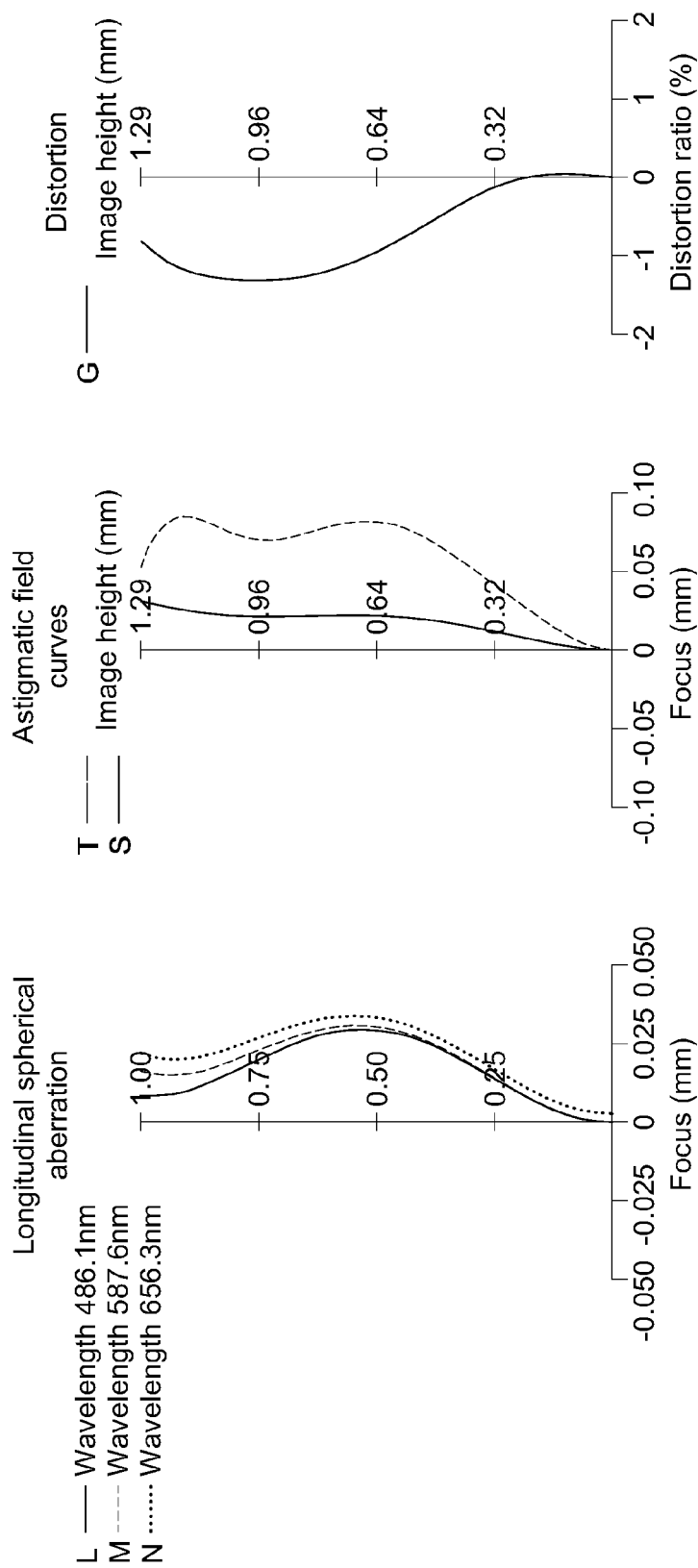

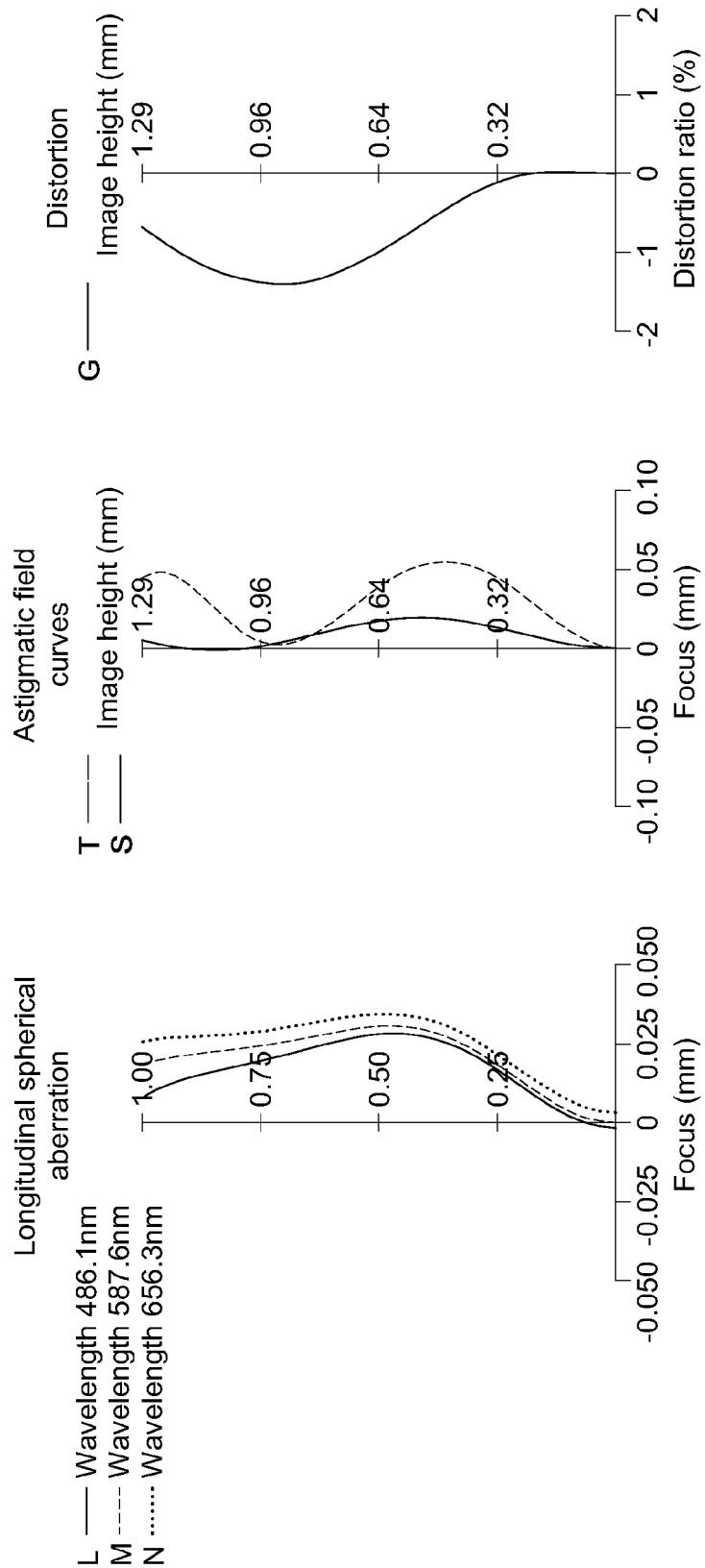

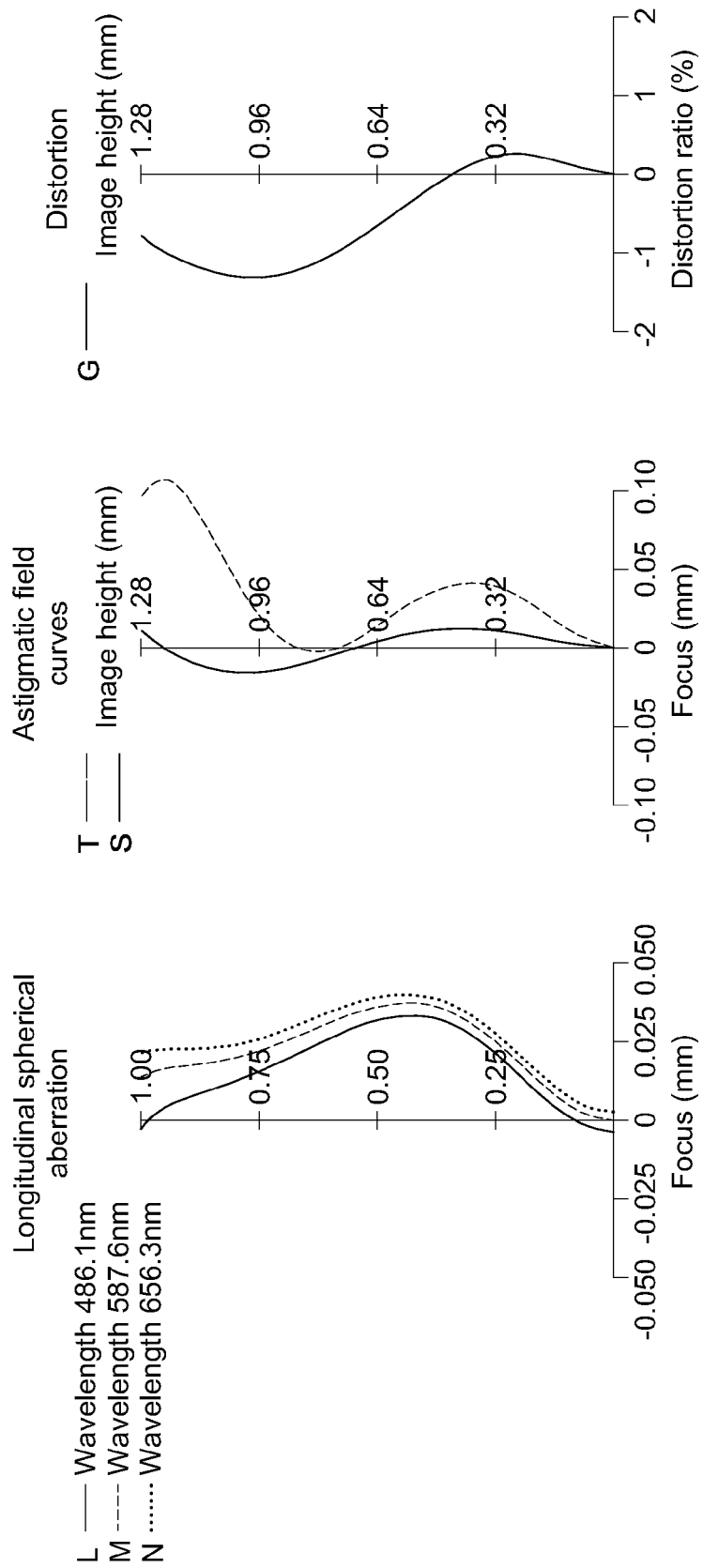

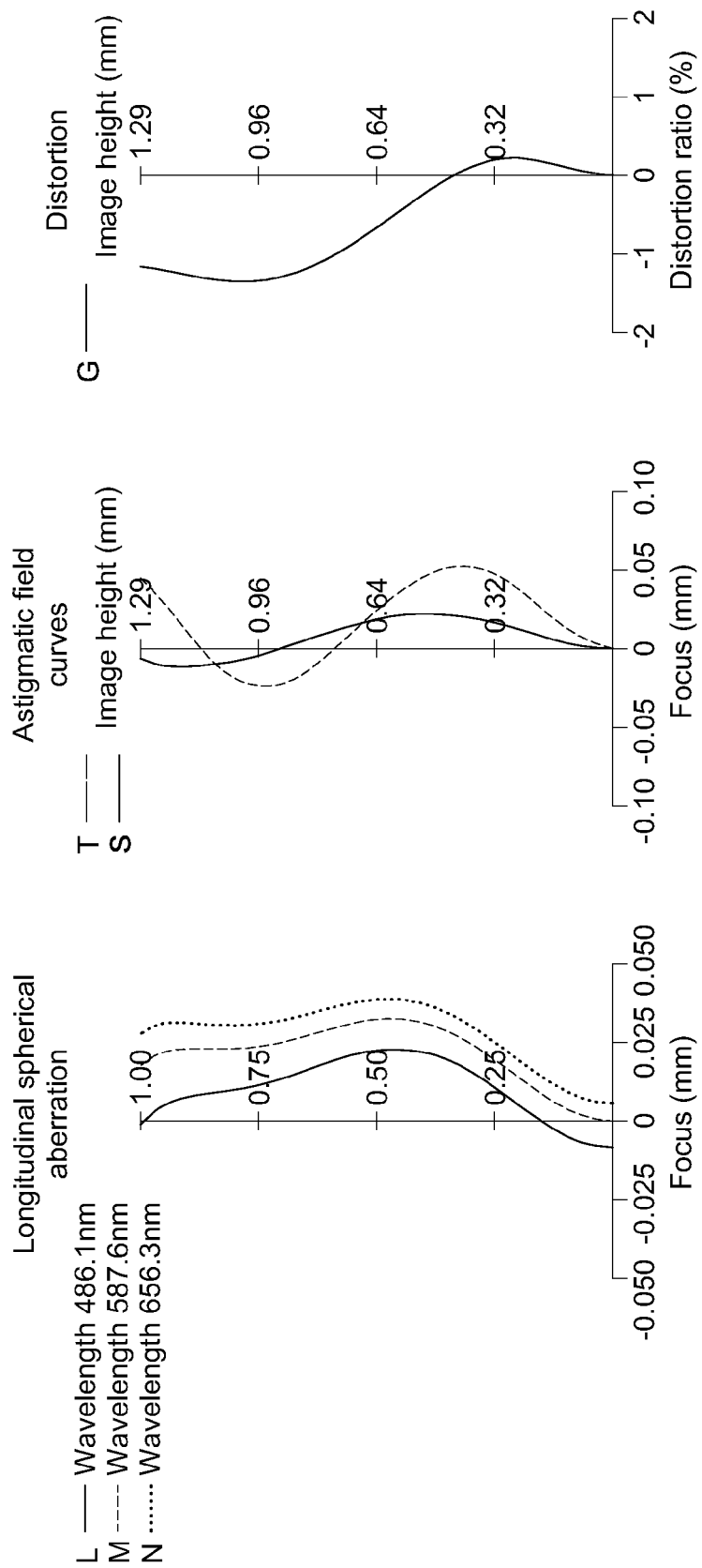

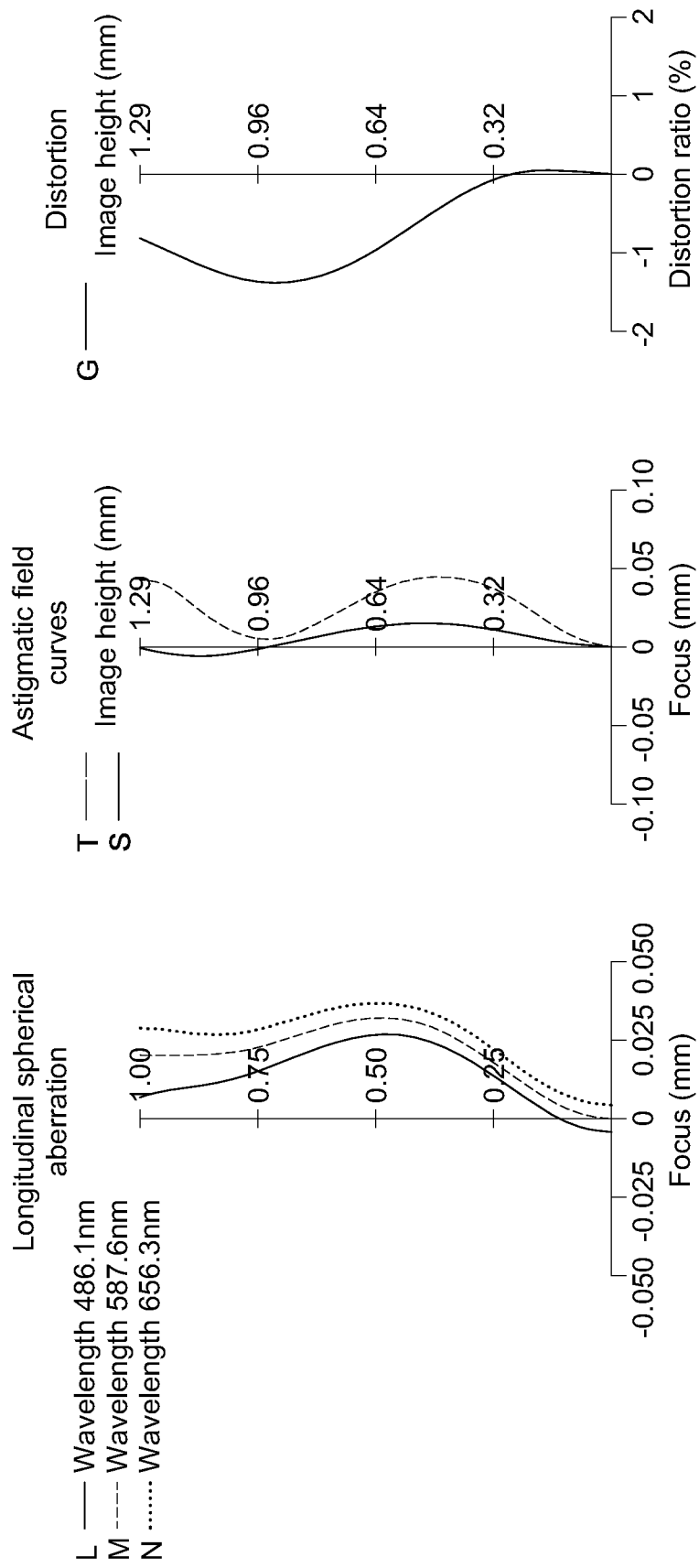

OPTICAL LENS ASSEMBLY FOR IMAGE TAKING

CROSS-REFERENCE TO RELATED APPLICATIONS

This non-provisional application claims priority under 35 U.S.C. §119(a) on Patent Application No(s). 100113275 filed in Taiwan, R.O.C. on Apr. 15, 2011, the entire contents of which are hereby incorporated by reference.

BACKGROUND

1. Technical Field

The disclosure relates to an optical lens assembly, and more particularly to an image-taking lens assembly used in a mobile electronic device.

2. Related Art

In recent years, with the prosperity of the image-taking function in mobile electronic devices, the demand for compact photographing camera lens increases exponentially. The photo-sensing device, e.g. a sensor, of an ordinary photographing camera is commonly selected from a charge coupled device (CCD) and a complementary metal-oxide semiconductor (CMOS) device. In addition, as the advanced semiconductor manufacturing technology enables the miniaturization of pixel size of sensors with the resolution of a compact optical lens assembly being gradually increased, there is an increasing demand for a compact optical lens assembly with better image quality.

A conventional photographing lens usually consists of four lens elements with an aperture stop placed in front of the lens elements. In U.S. Pat. No. 7,365,920 for example, a first lens element and a second lens element which are made of glass and are spherical are bonded together to form a doublet lens for correcting the chromatism. However, with too many spherical lenses in the photographing lens assembly causing the lack of system freedom, the total optical length of the lens assembly would be difficult to be shortened. Also, bonding the first lens element with the second lens element is complicated which creates problems when manufacturing. Moreover, with the miniaturization and the high standard of the image taking lens, assembling the lens assembly in a limited space would create the unnecessary light reflections in the lens barrel and, therefore, affect the image inside the lens. Accordingly, the inventors recognize that to prevent the unnecessary light going into the image area is necessary to maintain the image quality.

SUMMARY

According to the disclosure, an optical lens assembly for taking image comprises, in order from an object side to an image side: a front lens group, a stop, and a rear lens group. The front lens group comprises a first lens element with negative refractive power having a concave object-side surface. The rear lens group comprises, in order from the object side to the image side: a second lens element with positive refractive power having a concave object-side surface and a convex image-side surface, a third lens element with positive refractive power, and a fourth lens element with negative refractive power having a concave object-side surface and a convex image-side surface. At least one of the object-side surface and the image-side surface of the forth lens element is aspheric.

The optical lens assembly for image taking satisfies the following conditions:

$$-3.0 < R_1/R_2 < 0.9 \quad \text{(Condition 1)}$$

$$1.2 < f/f_3 < 2.0 \quad \text{(Condition 2)}$$

Wherein, $R_1$ is the radius of curvature of the object-side surface of the first lens element; $R_2$ is the radius of curvature of the image-side of the first lens element; f is the focal length of the optical lens assembly for image taking, and $f_3$ is the focal length of the third lens element.

According to another embodiment, an optical lens assembly for image taking comprises, in order from an object side to an image side: a first lens element with negative refractive power having a concave object-side surface, a second lens element having a concave object-side, a third lens element with positive refractive power, and a fourth lens element with negative refractive power having at least one aspheric surface.

The optical lens assembly for image taking satisfies the following conditions:

$$-3.0 < R_1/R_2 < 0.9 \quad \text{(Condition 1)}$$

$$|f/f_2| < 0.35 \quad \text{(Condition 3)}$$

$$0.5 < SL/TTL < 0.9 \quad \text{(Condition 4)}$$

Wherein, $R_1$ is the radius of curvature of the object-side surface of the first lens element; $R_2$ is the radius of curvature of the image-side surface of the first lens element; f is the focal length of the optical lens assembly for image taking; $f_2$ is the focal length of the second lens element. The optical lens assembly for image taking further comprises a stop and an image plane. SL is the axial distance between the stop and the image plane; TTL is the axial distance between the object-side surface of the first lens element and the image plane.

BRIEF DESCRIPTION OF THE DRAWINGS

The disclosure will become more fully understood from the following detailed description when taken in connection with the accompanying drawings, which show, for purpose of illustrations only, and thus do not limit other possible embodiments derived from the spirit of the disclosure, and wherein:

FIG. 1B is a schematic view of longitudinal spherical aberration curves when the lights having wavelengths of 486.1 nm, 587.6 nm, and 656.3 nm are respectively projected in the optical lens assembly for image taking in FIG. 1A;

FIG. 1C is a schematic view of astigmatic field curves when the light having the wavelength of 587.6 nm is projected in the optical lens assembly for image taking in FIG. 1A;

FIG. 1D is a schematic view of a distortion curve when the light having the wavelength of 587.6 nm is projected in the optical lens assembly for image taking in FIG. 1A;

FIG. 2B is a schematic view of longitudinal spherical aberration curves when the lights having wavelengths of 486.1 nm, 587.6 nm, and 656.3 nm are respectively projected in the optical lens assembly for image taking in FIG. 2A;

FIG. 2C is a schematic view of astigmatic field curves when the light having the wavelength of 587.6 nm is projected in the optical lens assembly for image taking in FIG. 2A;

FIG. 2D is a schematic view of a distortion curve when the light having the wavelength of 587.6 nm is projected in the optical lens assembly for image taking;

FIG. 4B is a schematic view of longitudinal spherical aberration curves when the lights having wavelengths of 486.1 nm, 587.6 nm, and 656.3 nm are respectively projected in the optical lens assembly for image taking in FIG. 4A;

FIG. 4C is a schematic view of astigmatic field curves when the light having the wavelength of 587.6 nm is projected in the optical lens assembly for image taking in FIG. 4A;

FIG. 4D is a schematic view of a distortion curve when the light having the wavelength of 587.6 nm is projected in the optical lens assembly for image taking in FIG. 4A;

FIG. 5B is a schematic view of longitudinal spherical aberration curves when the lights having wavelengths of 486.1 nm, 587.6 nm, and 656.3 nm are respectively projected in the optical lens assembly for image taking in FIG. 5A;

FIG. 5C is a schematic view of astigmatic field curves when the light having the wavelength of 587.6 nm is projected in the optical lens assembly for image taking in FIG. 5A;

FIG. 5D is a schematic view of a distortion curve when the light having the wavelength of 587.6 nm is projected in the optical lens assembly for image taking in FIG. 5A;

FIG. 6B is a schematic view of longitudinal spherical aberration curves when the lights having wavelengths of 486.1 nm, 587.6 nm, and 656.3 nm are respectively projected in the optical lens assembly for image taking in FIG. 6A;

FIG. 6C is a schematic view of astigmatic field curves when the light having the wavelength of 587.6 nm is projected in the optical lens assembly for image taking in FIG. 6A;

FIG. 6D is a schematic view of a distortion curve when the light having the wavelength of 587.6 nm is projected in the optical lens assembly for image taking in FIG. 6A;

FIG. 7B is a schematic view of longitudinal spherical aberration curves when the lights having wavelengths of 486.1 nm, 587.6 nm, and 656.3 nm are respectively projected in the optical lens assembly for image taking in FIG. 7A;

FIG. 7C is a schematic view of astigmatic field curves when the light having the wavelength of 587.6 nm is projected in the optical lens assembly for image taking in FIG. 7A;

FIG. 7D is a schematic view of a distortion curve when the light having the wavelength of 587.6 nm is projected in the optical lens assembly for image taking in FIG. 7A;

FIG. 8B is a schematic view of longitudinal spherical aberration curves when the lights having wavelengths of 486.1 nm, 587.6 nm, and 656.3 nm are respectively projected in the optical lens assembly for image taking in FIG. 8A;

FIG. 8C is a schematic view of astigmatic field curves when the light having the wavelength of 587.6 nm is projected in the optical lens assembly for image taking in FIG. 8A; and FIG. 8D is a schematic view of a distortion curve when the light having the wavelength of 587.6 nm is projected in the optical lens assembly for image taking in FIG. 8A.

DETAILED DESCRIPTION

Figure 1A:
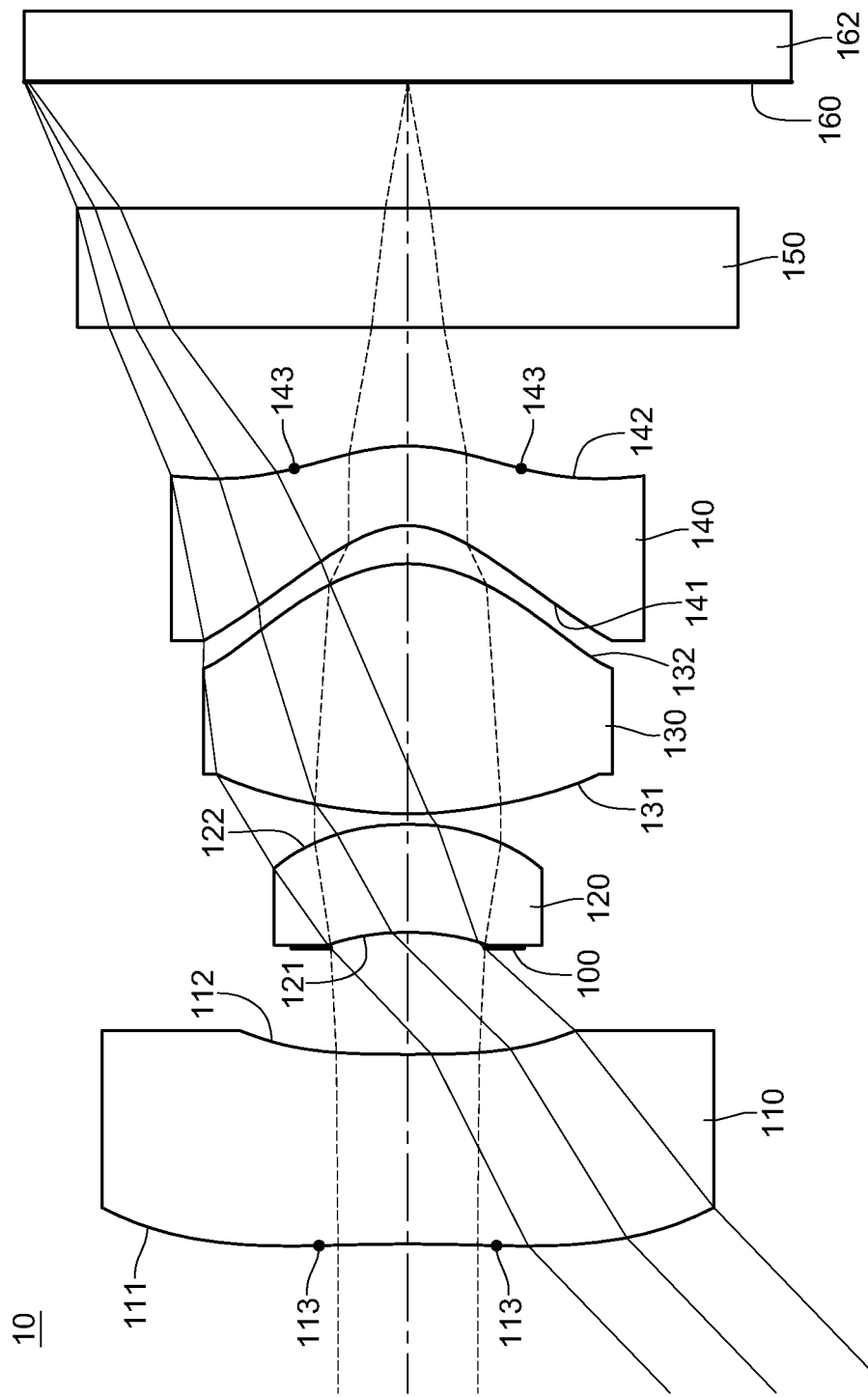
FIG. 1A is a schematic structural view of a first embodiment of an optical lens assembly for image taking according to the disclosure.

The optical lens assembly for image taking of the disclosure is described with FIG. 1A as an example, to illustrate that the embodiments have similar lens combination, configuration relationship, and the same conditions of the optical lens assembly. The differences are described in detail in the rest of embodiments of the disclosure.

As shown in FIG. 1A, the optical lens assembly for image taking 10 comprises, from an object side to an image side along an optical axis (from left to right in FIG. 1A) in sequence, a first lens element 110 with negative refractive power, a second lens element 120 with positive refractive power, a third lens element 130 with positive refractive power, and a fourth lens element 140 with negative refractive power.

The first lens element 110 with negative refractive power can enlarge the angle of view of the optical lens assembly for image taking 10. The first lens element 110 comprises a concave object-side surface 111 and an image-side surface 112. When the object-side surface 111 of the first lens element 110 is concave, the negative refractive power of the first lens element 110 is enhanced to increase the angle of view of the optical lens assembly for image taking 10. Moreover, the first lens element 110 has at least one inflection point which is, but is not limited to, the first inflection point 113. The inflection point can reduce the angle at which the light is projected onto an image plane from the off-axis field and further correcting the off-axis aberrations.

The second lens element 120 with positive refractive power provides the refractive power needed by the optical lens assembly for image taking 10 and corrects the aberration. The second lens element 120 comprises a concave object-side surface 121 and a convex image-side surface 122, which helps correcting the aberration of the optical lens assembly for image taking 10.

The third lens element 130 with positive refractive power can reduce the total optical length of the optical lens assembly for image taking 10. The third lens element 130 comprises an object-side surface 131 and a convex image-side surface 132, which corrects the astigmatism.

The fourth lens element 140 with negative refractive power comprises a concave object-side surface 141 and a convex image-side surface 142, which corrects the high order aberration of the optical lens assembly for image taking 10. The fourth lens element is made of plastic, and the object-side surface 141 and the image-side surface 142 of the fourth lens element 140 are both aspheric. Moreover, the fourth lens element 140 has at least one inflection point which is, but is not limited to, the inflection point 143. The inflection point can reduce the angle at which the off-axis light is projected onto an image plane, and, therefore, corrects the off-axis aberrations.

The optical lens assembly for image taking 10 of the disclosure satisfies the following conditions:

$$-3.0 < R_1/R_2 < 0.9 \quad \text{(Condition 1)}$$

$$1.2 < f/f_3 < 2.0 \quad \text{(Condition 2)}$$

Wherein, $R_1$ is the radius of curvature of the object-side surface 111 of the first lens element 110; $R_2$ is the radius of curvature of the image-side surface 112 of the first lens element 110; f is the focal length of the optical lens assembly for image taking 10, and $f_3$ is the focal length of the third lens element 130.

The third lens element 130 with positive refractive power can shorten the total optical length of the optical lens assembly 10 and also correspond with the fourth lens element 140 with negative refractive power to correct all kinds of aberrations created by the optical lens assembly for image making 10.

When the optical lens assembly for image taking 10 satisfies condition 1, the object-side surface 111 and the image-side surface 112 of the first lens element 110 have the proper radii of curvature to correct the spherical aberration of the optical lens assembly for image taking 10. Furthermore, in some embodiments, the range of condition 1 above is $-1.1 < R_1/R_2 < 0.7$. When the optical lens assembly for image taking 10 satisfies condition 2, the third lens element 130 has the proper refractive power, which reduces the total optical length of the optical lens assembly for image taking 10.

Moreover, the optical lens assembly for image taking 10 further comprises a stop 100 which is an aperture stop in this embodiment. The stop 100 is disposed between the first lens element 110 and the second lens element 120 so that a good balance between the telecentricity and a wider field of view can be obtained. Moreover, the optical lens assembly for image taking 10 also comprises an infrared filter 150, an image plane 160, and an image sensor 162. The image sensor 162 is disposed on the image plane 160 to receive the light going into the optical lens assembly for image taking 10.

The optical lens assembly for image taking 10 of the disclosure may further satisfy at least one of the following conditions:

$$|f/f_2| < 0.35 \quad \text{(Condition 3)}$$

$$0.5 < SL/TTL < 0.9 \quad \text{(Condition 4)}$$

$$0.1 < (R_5+R_6)/(R_5-R_6) < 0.8 \quad \text{(Condition 5)}$$

$$0.1 < R_7/R_8 < 0.8 \quad \text{(Condition 6)}$$

$$23 < V_3 - V_4 < 45 \quad \text{(Condition 7)}$$

$$0.15 < T_{34}/CT_4 < 1.5 \quad \text{(Condition 8)}$$

$$0.2 < CT_2/CT_1 < 1.0 \quad \text{(Condition 9)}$$

$$0.3 < R_7/R_6 < 0.8 \quad \text{(Condition 10)}$$

Wherein, $f_2$ is the focal length of the second lens element 120; SL is the axial distance between the stop 100 and the image plane 160; TTL is the axial distance between the object-side surface 111 of the first lens element 110 and the image plane 160; $R_5$ is the radius of curvature of the object-side surface 131 of the third lens element 130; $R_6$ is the radius of curvature of the image-side surface 132 of the third lens element 130; $R_7$ is the radius of curvature of the object-side surface 141 of the fourth lens element 140; $R_8$ is the radius of curvature of the image-side surface 142 of the fourth lens element 140; $V_3$ is the Abbe number of the third lens element 130; $V_4$ is the Abbe number of the fourth lens element 140; $T_{34}$ is the axial distance between the third lens element 130 and the fourth lens element 140; $CT_4$ is the central thickness of the fourth lens element 140; $CT_1$ is the central thickness of the first lens element 110, and $CT_2$ is the central thickness of the second lens element 120.

In this and some embodiments, the central thicknesses $CT_1$, $CT_2$ and $CT_4$ are the thicknesses of the first lens element 110, the second lens element 120 and the fourth lens element 130 on the optical axis respectively.

When the optical lens assembly for image taking 10 of the disclosure satisfies Condition 3, the refractive power of the second lens element 120 is more balanced, being capable of controlling the optical sensitivity of the optical lens assembly for image taking 10. Also, the balanced refractive power of the second lens element 120 is favorable for correcting the aberration of the optical lens assembly for image taking 10 for enhancing the image quality. In some embodiments, the range of Condition 3 above is $|f/f_2| < 0.20$. When the optical lens assembly for image taking 10 satisfies Condition 4, the stop 100 has the proper position so that a good balance between the telecentricity and a wider field of view can be obtained. When the optical lens assembly for image taking 10 satisfies Condition 5, the object-side surface 131 and the image-side surface 132 of the third lens element 130 have the proper radii of curvature, which strengthen the positive refractive power of the third lens element 130 and, therefore, reduce the total length of the optical lens assembly for image taking 10. In some embodiments, the range of Condition 5 above is $0.25 < (R_5+R_6)/(R_5-R_6) < 0.55$. When the optical lens assembly for image taking 10 satisfies Condition 6, the curvature of the fourth lens element 140 is not too bender that the high order aberration can be corrected. When the optical lens assembly for image taking 10 of the disclosure satisfies Condition 7, the chromatism is corrected. In some embodiments, the range of Condition 7 is $30 < V_3 - V_4 < 42$.

When the optical lens assembly for image taking 10 satisfies Condition 8, the central thickness of the fourth lens element 140 and the axial distance between the third lens element 130 and the fourth lens element 140 are proper, which can effectively reduce the total optical length. When the optical lens assembly for image taking 10 satisfies Condition 9, the first lens element 110 and the second lens element 120 both have proper central thicknesses, which benefits the fabrication of the optical lens assembly for image taking 10. When the optical lens assembly for image taking 10 satisfies Condition 10, the aberration is corrected.

Furthermore, the optical lens assembly for image taking 10 can be made of glass or plastic. If a lens of the disclosure is made of glass, there is more freedom in distributing the refractive power for the optical lens assembly for image taking 10. If a lens of the disclosure is made of plastic, the manufacturing cost can be reduced. In addition, the surfaces of lens elements can be aspheric. Aspheric profiles allow more design parameter freedom which can be used to reduce the aberration and the total number of the lens elements, so that the total optical length of the optical lens assembly for image taking 10 can be reduced effectively.

In the optical lens assembly for image taking 10, a convex surface means the surface is convex at a paraxial site. A concave surface means the surface is concave at a paraxial site. Besides, if necessary, at least one stop (such as glare stops, field stops, or other types of stops) may be disposed within the optical imaging system 10 for eliminating the stray light, adjusting the field of view, or other improvements concerning the image quality.

As for the optical lens assembly for image taking of the disclosure, the specific schemes are further described with the following embodiments. Parameters in the embodiments are defined as the following. Fno is an f-number value of the optical lens assembly, and HFOV is a half of a maximal viewing angle in the optical lens assembly. The aspheric surface in the embodiments may be represented by, but not limited to, the following aspheric surface equation (Condition ASP):

$$X(Y) = (Y^2/R)/(1 + \text{sqrt}(1 - (1+k)*(Y/R)^2)) + \sum_{i}(Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12 and 14.

The First Embodiment (Embodiment 1)

FIG. 1A is a schematic structural view of the first embodiment of the optical lens assembly for image taking In this embodiment, the wavelength of light received by the optical lens assembly for image taking 10 is 587.6 nm, but the wavelength is not limited to the value above and can be altered according to the requirement.

In this embodiment, the first lens element 110 with negative refractive power comprises the concave object-side surface 111. The second lens element 120 with positive refractive power comprises a concave object-side surface 121 and a convex image-side surface 122. The third lens element 130 with positive refractive power comprises a convex image-side surface 132. The fourth lens element 140 with negative refractive power comprises a concave object-side surface 141 and a convex image-side surface 142. Moreover, the first lens element 110 can have the inflection point 113, and the fourth lens element 140 can have the inflection point 143. A stop, such as the aperture stop 100, can be disposed between the first lens element 110 and the second lens element 120.

The detailed data of the optical lens assembly for image taking 10 is as shown in Table 1-1 below:

TABLE 1-1

Embodiment 1
f = 1.34 mm, Fno = 2.85, HFOV = 43.9 deg.

| Surface # | Member | Radius of Curvature(mm) | Thickness (mm) | Material | Index | Abbe # | Focal length |
|---|---|---|---|---|---|---|---|
| 0 | Object | Plano | Infinity | | | | |
| 1 | Lens 1 | −5.780900(ASP) | 0.638 | Plastic | 1.544 | 55.9 | −6.19 |
| 2 | | 8.389900(ASP) | 0.356 | | | | |
| 3 | Ape. Stop | Plano | 0.054 | | | | |
| 4 | Lens 2 | −0.913340(ASP) | 0.363 | Plastic | 1.544 | 55.9 | 20.75 |
| 5 | | −0.963340(ASP) | 0.035 | | | | |
| 6 | Lens 3 | 1.163100(ASP) | 0.841 | Plastic | 1.544 | 55.9 | 0.73 |
| 7 | | −0.449140(ASP) | 0.128 | | | | |
| 8 | Lens 4 | −0.281920(ASP) | 0.267 | Plastic | 1.634 | 23.8 | −1.09 |
| 9 | | −0.651090(ASP) | 0.400 | | | | |
| 10 | Infrared Filter | Plano | 0.400 | Glass | 1.516 | 64.1 | — |
| 11 | | Plano | 0.424 | | | | |
| 12 | Image Plane | Plano | — | | | | |

Note:
Reference wavelength is d-line 587.6 nm, ASP represents aspherical

In Table 1-1, the first lens element 110, the second lens element 120, the third lens element 130, the fourth lens element 140, the fifth lens element 150, and the sixth lens element 160 can all be aspherical, and the aspheric surfaces can satisfy Condition ASP, but are not limited thereto. As for the parameters of the aspheric surfaces, reference is made to Table 1-2 below:

TABLE 1-2

| Aspheric Coefficients | | | | |
|---|---|---|---|---|
| Surface# | 1 | 2 | 4 | 5 |
| k = | −1.00000E+00 | −3.23240E+01 | 2.69685E+00 | 1.83465E+00 |
| $A_4$ = | 3.33566E−01 | 9.24106E−01 | 6.27396E−02 | −1.72933E+00 |
| $A_6$ = | −2.63127E−01 | −1.69371E+00 | −2.58577E+00 | 1.39972E+01 |
| $A_8$ = | 1.74632E−01 | 4.06471E+00 | 7.91749E+01 | −4.95475E+01 |
| $A_{10}$ = | −4.92521E−02 | −5.90357E+00 | −8.59440E+02 | 5.30589E+01 |

TABLE 1-2-continued

| Aspheric Coefficients | | | | |
|---|---|---|---|---|
| $A_{12} =$ | — | — | −4.83399E−08 | −4.66172E−08 |
| $A_{14} =$ | — | — | −3.55905E−08 | −3.48310E−08 |
| Surface# | 6 | 7 | 8 | 9 |
| k = | −3.52711E+01 | −2.85653E+00 | −2.03259E+00 | −3.54738E+00 |
| $A_4 =$ | 4.40605E−01 | −8.58778E−01 | 5.02242E−01 | 1.07240E+00 |
| $A_6 =$ | −6.12107E−01 | 1.58898E+00 | −8.45251E−01 | −1.28394E+00 |
| $A_8 =$ | 8.14502E−01 | −6.17680E−01 | 1.22365E+00 | 7.79848E−01 |
| $A_{10} =$ | −2.40426E−01 | 7.95198E−01 | −6.57895E−01 | −2.35826E−01 |

In Table 1-1, the radius of curvature, the thickness and the focal length are shown in millimeters (mm). Surface numbers 0-12 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A14 represent the aspheric coefficients ranging from the 1st order to the 14th. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | | | |
|---|---|---|---|
| f (mm) | 1.34 | $(R_5 + R_6)/(R_5 − R_6)$ | 0.44 |
| Fno | 2.85 | $CT_2/CT_1$ | 0.57 |
| HFOV(deg.) | 43.9 | $T_{34}/CT_4$ | 0.48 |
| $V_3 − V_4$ | 32.1 | $|f/f_2|$ | 0.06 |
| $R_1/R_2$ | −0.69 | $f/f_3$ | 1.83 |
| $R_7/R_6$ | 0.63 | SL/TTL | 0.74 |
| $R_7/R_8$ | 0.43 | | |

It can be observed from Table 1-3 that, $R_1/R_2$ satisfies Condition 1; $f/f_3$ satisfies Condition 2; $|f/f_2|<0.35$ satisfies Condition 3, and SL/TTL satisfies Condition 4.

$(R_5+R_6)/(R_5−R_6)$ satisfies Condition 5; $R_7/R_8$ satisfies Condition 6; $V_3−V_4$ satisfies Condition 7; $T_{34}/CT_4$ satisfies Condition 8; $CT_2/CT_1$ satisfies Condition 9, and $R_7/R_6$ satisfies Condition 10.

FIG. 1B is a schematic view of longitudinal spherical aberration curves when the lights having wavelengths of 486.1 nm, 587.6 nm, and 656.3 nm are respectively projected in the optical lens assembly for image taking 10 in FIG. 1A. The longitudinal spherical aberration curve of the light having the wavelength of 486.1 nm in the optical lens assembly for image taking 10 is indicated by a solid line L in FIG. 1B. The longitudinal spherical aberration curve of the light having the wavelength of 587.6 nm in the optical lens assembly for image taking 10 is indicated by a dashed line M in FIG. 1B. The longitudinal spherical aberration curve of the light having the wavelength of 656.3 nm in the optical lens assembly for image taking 10 is indicated by a dotted line N in FIG. 1B. Horizontal axis is the focus position (millimeter, mm), and vertical axis is the normalized entrance pupil or the aperture value. In other words, the differences of the focus positions of the paraxial light (the longitudinal coordinate is close to 0) and the fringe light (the longitudinal coordinate is close to 1) on the image plane 160 can be seen from the longitudinal spherical aberration curves, in which the paraxial light and the fringe light are parallel to the optical axis. It can be observed from FIG. 1B that, no matter if the wavelength is 486.1 nm, 587.6 nm, or 656.3 nm, the longitudinal spherical aberrations generated by the optical lens assembly for image taking 10 are within a range of −0.01 mm to 0.040 mm.

In the second embodiment to the eighth embodiment and the schematic views of the longitudinal spherical aberration curves in FIGS. 2B, 3B, 4B, 5B, 6B, 7B, and 8B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a schematic view of astigmatic field curves when the light having the wavelength of 587.6 nm is projected in the optical lens assembly for image taking in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). The variation of the focus position due to the different curvature of the tangential plane and the sagittal plane can be observed from the astigmatic field curves. It can be observed from FIG. 1C that, the astigmatic field curvature of the tangential plane is within a range of 0.00 mm to 0.06 mm, and the astigmatic field curvature of the sagittal plane is within a range of −0.010 mm to 0.025 mm.

In the second embodiment to the eighth embodiment and the schematic views of the astigmatic field curves in FIGS. 2C, 3C, 4C, 5C, 6C, 7C, and 8C, the solid line S indicates the astigmatic field curve of the sagittal plane, and the dashed line T indicates the astigmatic field curve of the tangential plane, which will not be repeated herein for conciseness.

FIG. 1D is a schematic view of a distortion curve when the light having the wavelength of 587.6 nm is projected in the optical lens assembly for image taking in FIG. 1A. The horizontal axis is the distortion ratio (%), and the vertical axis is the image height (mm). The variation of the distortion ratio due to the different image height can be seen from the distortion curve G. It can be observed from FIG. 1D that, the distortion ratio is within a range of −1.5% to 0%. As shown in FIGS. 1B to 1D, the optical lens assembly for image taking 10, designed according to the first embodiment, is capable of effectively correcting various aberrations.

In the second embodiment to the eighth embodiment and the schematic views of the distortion curves in FIGS. 2D, 3D, 4D, 5D, 6D, 7D, and 8D, the solid line G indicates the distortion curve of the light having the wavelength of 587.6 nm, which will not be repeated herein for conciseness.

It should be noted that, the distortion curves and the astigmatic field curves generated having the wavelength of 486.1 nm and 656.3 nm are highly similar to the distortion curve and the astigmatic field curves having the wavelength of 587.6 nm. In order to prevent the confusion of reading the figures in FIGS. 1C and 1D, the distortion curve and the astigmatic field curves of wavelengths of 486.1 nm and 656.3 nm are not shown in FIGS. 1C and 1D, and the same applies throughout the rest of the embodiments of this disclosure.

The Second Embodiment (Embodiment 2)

Figure 2A:
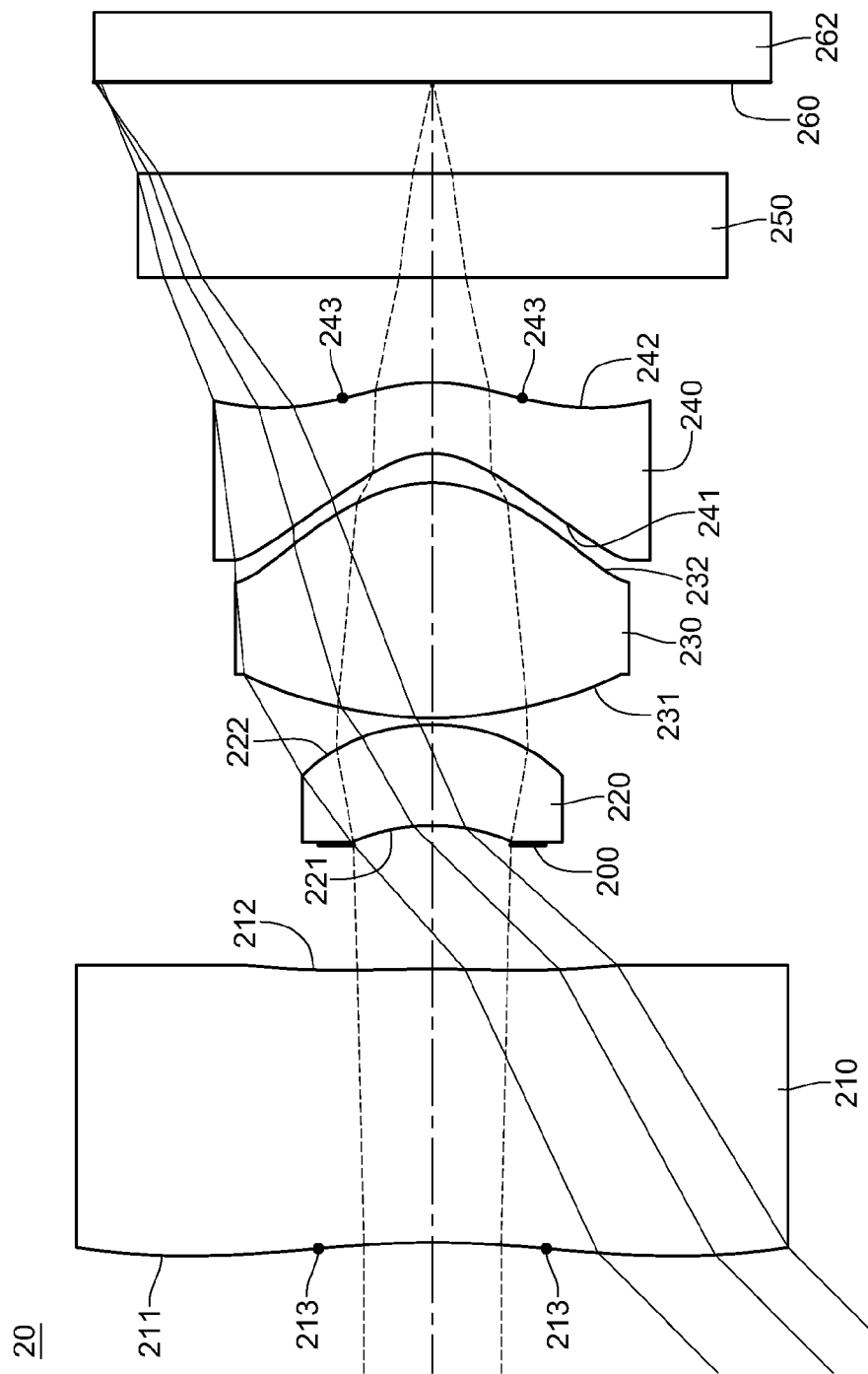
FIG. 2A is a schematic structural view of a second embodiment of an optical lens assembly for image taking according to the disclosure.

FIG. 2A is a schematic structural view of a second embodiment of an optical lens assembly for image taking 20. The specific implementation and elements of the second embodiment are substantially the same as that in the first embodiment. The element symbols in the second embodiment all begin with "2", which correspond to those in the first embodiment with the same function or structure. For conciseness, only the differences are illustrated below, and the similarities will not be repeated herein.

In this embodiment, for example, the wavelength of the light received by the optical lens assembly for image taking 20 is 587.6 nm, but this wavelength may be altered according to actual requirements, and is not limited to the wavelength value mentioned above.

In this embodiment, a first lens element 210 with negative refractive power comprises a concave object-side surface 211 and two inflection points 213. A second lens element 220 with positive refractive power comprises a concave object-side surface 221 and a convex image-side surface 222. A third lens element 230 with positive refractive power comprises a convex image-side surface 232. A fourth lens element 240 with negative refractive power comprises a concave object-side surface 241, a convex image-side surface 242, and two inflection points 243. A stop 200 which is an aperture stop in this embodiment is disposed between the first lens element 210 and the second lens element 220.

The detailed data of the optical lens assembly for image taking 20 is as shown in Table 2-1 below:

TABLE 2-1

Embodiment 2
f = 1.29 mm, Fno = 2.45, HFOV = 44.9 deg.

| Surface# | Member | Radius of Curvature (mm) | Thickness (mm) | Material | Index | Abbe # | Focal length |
|---|---|---|---|---|---|---|---|
| 0 | Object | Plano | Infinity | | | | |
| 1 | Lens 1 | −3.399300(ASP) | 1.047 | Plastic | 1.544 | 55.9 | −14.89 |
| 2 | | −6.492800(ASP) | 0.475 | | | | |
| 3 | Ape. Stop | Plano | 0.074 | | | | |
| 4 | Lens 2 | −0.813270(ASP) | 0.386 | Plastic | 1.544 | 55.9 | 12.55 |
| 5 | | −0.848270(ASP) | 0.025 | | | | |
| 6 | Lens 3 | 1.199420(ASP) | 0.902 | Plastic | 1.544 | 55.9 | 0.79 |
| 7 | | −0.494600(ASP) | 0.111 | | | | |
| 8 | Lens 4 | −0.299340(ASP) | 0.272 | Plastic | 1.634 | 23.8 | −1.16 |
| 9 | | −0.684560(ASP) | 0.400 | | | | |
| 10 | Infrared Filter | Plano | 0.400 | Glass | 1.516 | 64.1 | — |
| 11 | | Plano | 0.350 | | | | |
| 12 | Image Plane | Plano | — | | | | |

Note:
Reference wavelength is d-line 587.6 nm, ASP represents aspherical.

In Table 2-1, from the first lens element 210 to the sixth lens element 260, all lenses can be aspherical, and the aspheric surfaces can satisfy Condition ASP, but are not limited thereto. As for the parameters of the aspheric surfaces, reference is made to Table 2-2 below.

TABLE 2-2

| | Aspheric Coefficients | | | |
|---|---|---|---|---|
| Surface# | 1 | 2 | 4 | 5 |
| k = | −1.00000E+00 | −2.12154E+01 | 1.62956E+00 | 1.23795E+00 |
| $A_4$ = | 1.48524E−01 | 4.04000E−01 | 2.75495E−01 | −7.69200E−01 |
| $A_6$ = | −7.19081E−02 | −6.06725E−01 | −6.93434E+00 | 4.00938E+00 |
| $A_8$ = | 2.36915E−02 | 4.98249E−01 | 1.13701E+02 | −5.50363E−01 |

TABLE 2-2-continued

| Aspheric Coefficients | | | | |
|---|---|---|---|---|
| $A_{10}=$ | −3.56692E−03 | −2.15125E−01 | −6.49132E+02 | −1.07179E+01 |
| $A_{12}=$ | — | — | −4.69659E−08 | −5.76446E−08 |
| $A_{14}=$ | — | — | −3.45169E−08 | −3.55730E−08 |

| Surface# | 6 | 7 | 8 | 9 |
|---|---|---|---|---|
| k = | −2.49291E+01 | −3.24218E+00 | −2.17596E+00 | −4.28093E+00 |
| $A_4=$ | 3.42038E−01 | −8.78871E−01 | 3.94783E−01 | 1.04708E+00 |
| $A_6=$ | −4.62094E−01 | 1.61465E+00 | −1.03749E+00 | −1.37697E+00 |
| $A_8=$ | 6.33057E−01 | −1.59886E+00 | 1.60349E+00 | 9.88754E−01 |
| $A_{10}=$ | −2.87204E−01 | 1.67370E+00 | −4.79334E−01 | −2.98073E−01 |

The content of Table 2-3 may be deduced from Table 2-1.

TABLE 2-3

| Embodiment 2 | | | |
|---|---|---|---|
| f (mm) | 1.29 | $(R_5 + R_6)/(R_5 - R_6)$ | 0.42 |
| Fno | 2.45 | $CT_2/CT_1$ | 0.37 |
| HFOV(deg.) | 44.9 | $T_{34}/CT_4$ | 0.41 |
| $V_3 - V_4$ | 32.1 | $|f/f_2|$ | 0.10 |
| $R_1/R_2$ | 0.52 | $f/f_3$ | 1.62 |
| $R_7/R_6$ | 0.61 | SL/TTL | 0.65 |
| $R_7/R_8$ | 0.44 | | |

FIG. 2B is a schematic view of longitudinal spherical aberration curves when the lights having wavelengths of 486.1 nm, 587.6 nm, and 656.3 nm are respectively projected in the optical lens assembly for image taking 20 in FIG. 2A. It can be observed from FIG. 2B that, when the different wavelengths, 486.1 nm, 587.6 nm, and 656.3 nm, of the light are received by the optical lens assembly for image taking 20, the longitudinal spherical aberrations generated by the optical lens assembly for image taking 20 are within a range of −0.010 mm to 0.040 mm.

FIG. 2C is a schematic view of astigmatic field curves when the light having the wavelength of 587.6 nm is projected in the optical lens assembly for image taking 20 in FIG. 2A. It can be observed from FIG. 2C that, when the light having the wavelength of 587.6 nm is projected in the optical lens assembly for image taking 20, the astigmatic field curvature of the tangential plane generated is within a range of 0.0 mm to 0.10 mm, and the astigmatic field curvature of the sagittal plane generated is within a range of 0.0 mm to 0.04 mm.

FIG. 2D is a schematic view of a distortion curve when the light having the wavelength of 587.6 nm is projected in the optical lens assembly for image taking 20 in FIG. 2A. It can be observed from FIG. 2D that, the distortion ratio generated when the light having the wavelength of 587.6 nm is projected in the optical lens assembly for image taking 20 is within a range of −1.5% to 0.0%. As shown in FIGS. 2B to 2D, the optical lens assembly for image taking 20, designed according to the second embodiment, is capable of effectively correcting various aberrations.

The Third Embodiment (Embodiment 3)

Figure 3A:
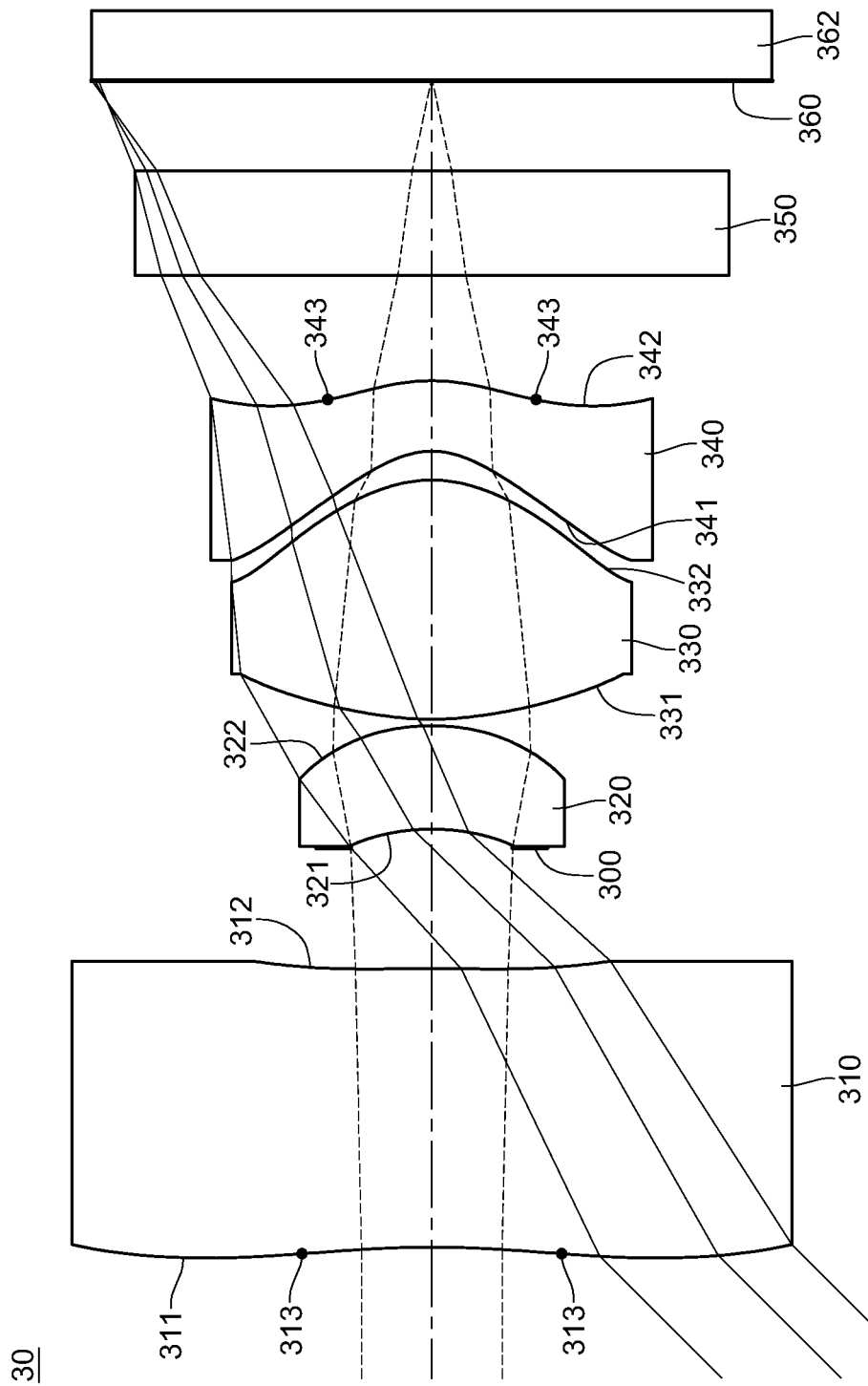
FIG. 3A is a schematic structural view of a third embodiment of an optical lens assembly for image taking according to the disclosure.

FIG. 3A is a schematic structural view of a third embodiment of an optical lens assembly for image taking 30. The specific implementation and elements of the third embodiment are substantially the same as that in the first embodiment. The element symbols in the third embodiment all begin with "3", which correspond to those in the first embodiment with the same function or structure. For conciseness, only the differences are illustrated below, and the similarities will not be repeated herein.

In this embodiment, for example, the wavelength of the light received by the optical lens assembly for image taking 30 is 587.6 nm, but the wavelength may be altered according to actual requirements, and is not limited to the wavelength value mentioned above.

In this embodiment, a first lens element 310 with negative refractive power comprises a concave object-side surface 311 and two inflection points 313. A second lens element 320 with positive refractive power comprises a concave object-side surface 321 and a convex image-side surface 322. A third lens element 330 with positive refractive power comprises a convex image-side surface 332. A fourth lens element 340 with negative refractive power comprises a concave object-side surface 341, a convex image-side surface 342, and two inflection points 343. A stop 300 which is an aperture stop in this embodiment is disposed between the first lens element 310 and the second lens element 320.

The detailed data of the optical lens assembly for image taking 30 is as shown in Table 3-1 below.

TABLE 3-1

Embodiment 3
f = 1.29 mm, Fno = 2.40, HFOV = 45.0 deg.

| Surface# | Member | Radius of Curvature | Thickness (mm) | Material | Index | Abbe # | Focal length |
|---|---|---|---|---|---|---|---|
| 0 | Object | Plano | Infinity | | | | |
| 1 | Lens 1 | −3.698700(ASP) | 1.062 | Plastic | 1.543 | 56.5 | −11.22 |
| 2 | | −10.356100(ASP) | 0.461 | | | | |
| 3 | Ape. Stop | Plano | 0.071 | | | | |
| 4 | Lens 2 | −0.842470(ASP) | 0.394 | Plastic | 1.544 | 55.9 | 13.09 |
| 5 | | −0.877520(ASP) | 0.025 | | | | |
| 6 | Lens 3 | 1.140010(ASP) | 0.912 | Plastic | 1.544 | 55.9 | 0.80 |
| 7 | | −0.505380(ASP) | 0.110 | | | | |
| 8 | Lens 4 | −0.302000(ASP) | 0.269 | Plastic | 1.634 | 23.8 | −1.17 |
| 9 | | −0.685680(ASP) | 0.400 | | | | |

TABLE 3-1-continued

Embodiment 3
f = 1.29 mm, Fno = 2.40, HFOV = 45.0 deg.

| Surface# | Member | Radius of Curvature | Thickness (mm) | Material | Index | Abbe # | Focal length |
|---|---|---|---|---|---|---|---|
| 10 | IR-filter | Plano | 0.400 | Glass | 1.516 | 64.1 | — |
| 11 | | Plano | 0.345 | | | | |
| 12 | Image Plane | Plano | — | | | | |

Note:
Reference wavelength is d-line 587.6 nm, ASP represents aspherical

In Table 3-1, from the first lens element 310 to the sixth lens element 360, all lenses can be aspherical, and the aspheric surfaces can satisfy Condition ASP, but are not limited thereto. As for the parameters of the aspheric surfaces, reference is made to Table 3-2 below.

TABLE 3-2

Aspheric Coefficients

| Surface# | 1 | 2 | 4 | 5 |
|---|---|---|---|---|
| k = | −1.00000E+00 | −1.92642E+01 | 1.23661E+00 | 1.41724E+00 |
| $A_4$ = | 1.48793E−01 | 4.49894E−01 | 3.52125E−02 | −9.00550E−01 |
| $A_6$ = | −7.26458E−02 | −6.90676E−01 | −5.14575E+00 | 4.19100E+00 |
| $A_8$ = | 2.45876E−02 | 6.51395E−01 | 1.03935E+02 | −2.26433E+00 |
| $A_{10}$ = | −3.70206E−03 | −3.37844E−01 | −9.55453E+02 | −5.01830E+00 |
| $A_{12}$ = | — | — | 2.27858E+03 | −5.02789E−06 |
| $A_{14}$ = | — | — | −1.50270E−06 | −1.46160E−06 |

| Surface# | 6 | 7 | 8 | 9 |
|---|---|---|---|---|
| k = | −2.28050E+01 | −3.25158E+00 | −2.16525E+00 | −4.17895E+00 |
| $A_4$ = | 3.25825E−01 | −8.53173E−01 | 3.84179E−01 | 1.06901E+00 |
| $A_6$ = | −4.77820E−01 | 1.57269E+00 | −1.02822E+00 | −1.43187E+00 |
| $A_8$ = | 6.68216E−01 | −1.63165E+00 | 1.59115E+00 | 1.06789E+00 |
| $A_{10}$ = | −3.25746E−01 | 1.61569E+00 | −4.93317E−01 | −3.39360E−01 |

The content of Table 3-3 may be deduced from Table 3-1.

TABLE 3-3

Embodiment 3

| f (mm) | 1.29 | $(R_5 + R_6)/(R_5 − R_6)$ | 0.39 |
|---|---|---|---|
| Fno | 2.40 | $CT_2/CT_1$ | 0.37 |
| HFOV(deg.) | 45.0 | $T_{34}/CT_4$ | 0.41 |
| $V_3 − V_4$ | 32.1 | $|f/f_2|$ | 0.10 |
| $R_1/R_2$ | 0.36 | $f/f_3$ | 1.61 |
| $R_7/R_6$ | 0.60 | SL/TTL | 0.65 |
| $R_7/R_8$ | 0.44 | | |

Figures 3B, 3C, 3D:
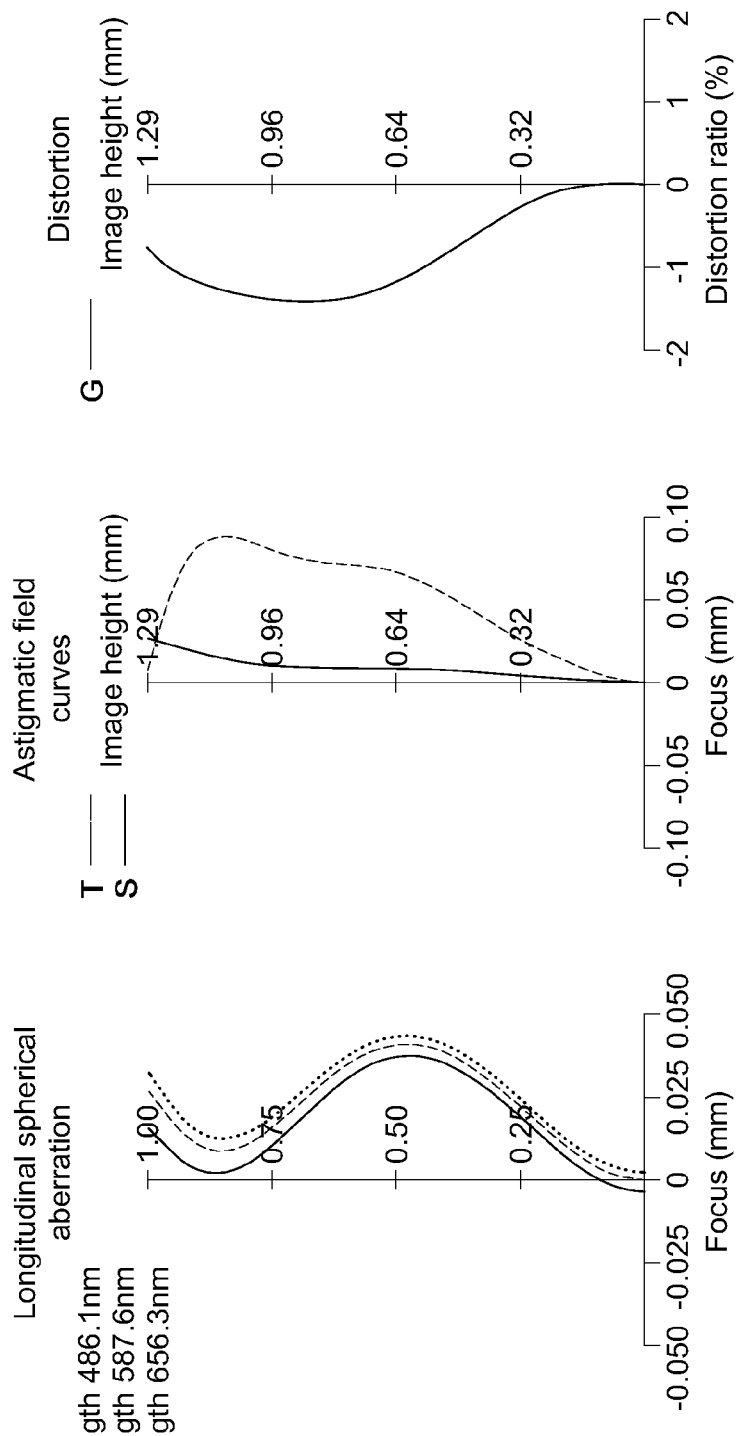
FIG. 3B is a schematic view of longitudinal spherical aberration curves when the lights having wavelengths of 486.1 nm, 587.6 nm, and 656.3 nm are respectively projected in the optical lens assembly for image taking in FIG. 3A.
FIG. 3C is a schematic view of astigmatic field curves when the light having the wavelength of 587.6 nm is projected in the optical lens assembly for image taking in FIG. 3A.
FIG. 3D is a schematic view of a distortion curve when the light having the wavelength of 587.6 nm is projected in the optical lens assembly for image taking in FIG. 3A.

FIG. 3B is a schematic view of longitudinal spherical aberration curves when the lights having wavelengths of 486.1 nm, 587.6 nm, and 656.3 nm are respectively projected in the optical lens assembly for image taking 30 in FIG. 3A. It can be observed from FIG. 3B that, when the different wavelengths, 486.1 nm, 587.6 nm, and 656.3 nm, of the light are received by the optical lens assembly for image taking 30, the longitudinal spherical aberrations generated by the optical lens assembly for image taking 30 are within a range of −0.010 mm to 0.040 mm.

FIG. 3C is a schematic view of astigmatic field curves when the light having the wavelength of 587.6 nm is projected in the optical lens assembly for image taking 30 in FIG. 3A. It can be observed from FIG. 3C that, when the light having the wavelength of 587.6 nm is projected in the optical lens assembly for image taking 30, the astigmatic field curvature of the tangential plane generated is within a range of 0.0 mm to 0.1 mm, and the astigmatic field curvature of the sagittal plane generated is within a range of 0.0 mm to 0.040 mm.

FIG. 3D is a schematic view of a distortion curve when the light having the wavelength of 587.6 nm is projected in the optical lens assembly for image taking 30 in FIG. 3A. It can be observed from FIG. 3D that, the distortion ratio generated when the light having the wavelength of 587.6 nm is projected in the optical lens assembly for image taking 30 is within a range of −1.5% to 0%. As shown in FIGS. 3B to 3D, the optical lens assembly for image taking 30, designed according to the third embodiment, is capable of effectively correcting various aberrations.

The Fourth Embodiment (Embodiment 4)

Figure 4A:
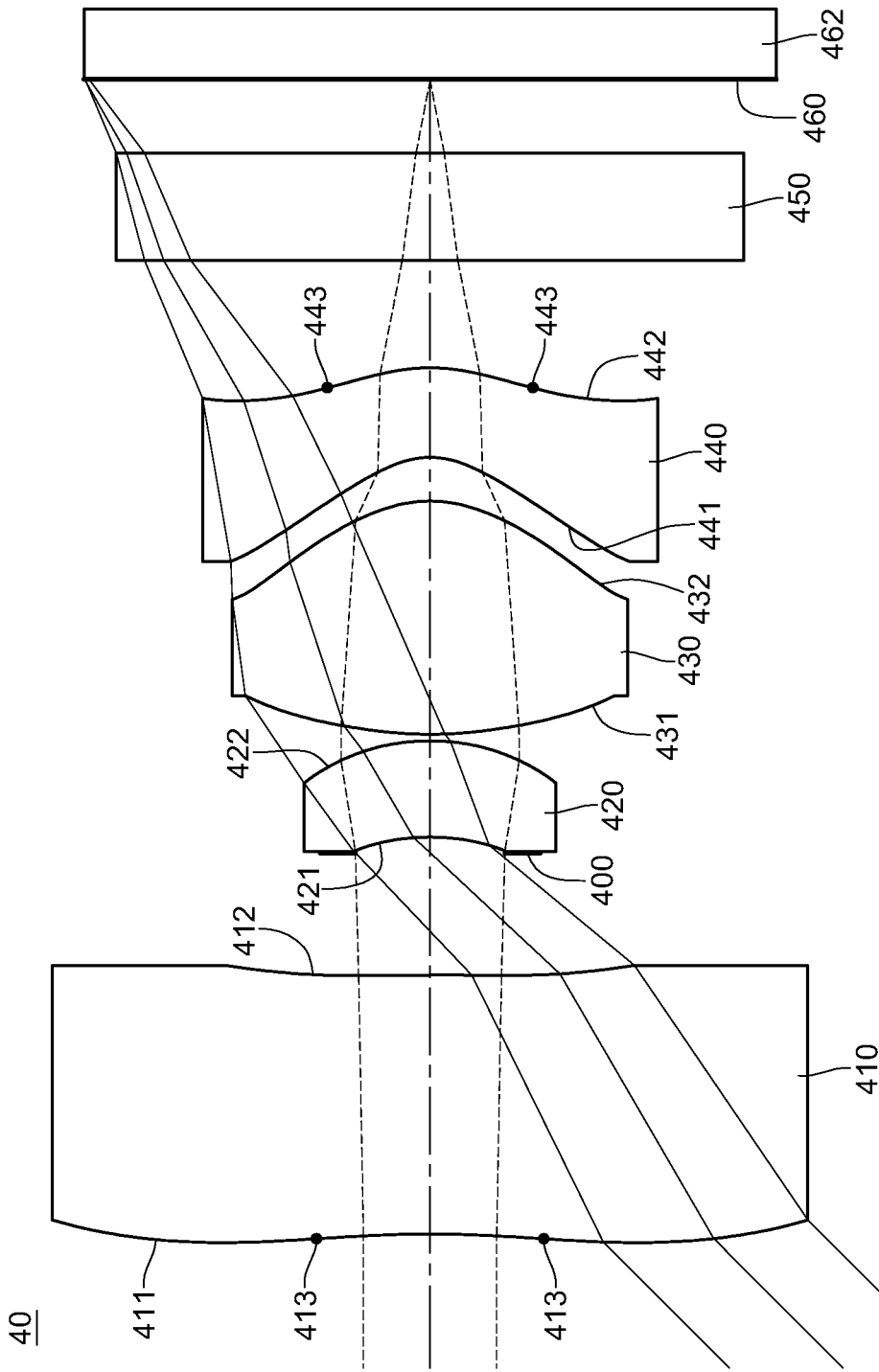
FIG. 4A is a schematic structural view of a fourth embodiment of an optical lens assembly for image taking according to the disclosure.

FIG. 4A is a schematic structural view of a fourth embodiment of an optical lens assembly for image taking 40. The specific implementation and elements of the fourth embodiment are substantially the same as that in the first embodiment. The element symbols in the fourth embodiment all begin with "4", which correspond to those in the first embodiment with the same function or structure. For conciseness, only the differences are illustrated below, and the similarities will not be repeated herein.

In this embodiment, for example, the wavelength of the light received by the optical lens assembly for image taking 40 is 587.6 nm, but the wavelength may be altered according to actual requirements, and is not limited to the wavelength value mentioned above.

In this embodiment, a first lens element 410 with negative refractive power comprises a concave object-side surface 411 and two inflection points 413. A second lens element 420 with positive refractive power comprises a concave object-side surface 421 and a convex image-side surface 422. A third lens element with positive refractive power comprises a convex image-side surface 432. A fourth lens element 440 with negative refractive power comprises a concave object-side surface 441, a convex image-side surface 442, and two inflection points 443. A stop 400 which is an aperture stop in this embodiment is disposed between the first lens element 410 and the second lens element 420.

The detailed data of the optical lens assembly for image taking 40 is as shown in Table 4-1 below.

TABLE 4-1

Embodiment 4
f = 1.29 mm, Fno = 2.60, HFOV = 44.9 deg.

| Surface# | Member | Radius of Curvature | Thickness (mm) | Material | Index | Abbe # | Focal length |
|---|---|---|---|---|---|---|---|
| 0 | Object | Plano | Infinity | | | | |
| 1 | Lens 1 | −4.058000 (ASP) | 0.965 | Plastic | 1.544 | 55.9 | −14.72 |
| 2 | | −8.913100(ASP) | 0.455 | | | | |
| 3 | Ape. Stop | Plano | 0.059 | | | | |
| 4 | Lens 2 | −0.817960(ASP) | 0.358 | Plastic | 1.544 | 55.9 | 14.25 |
| 5 | | −0.854050(ASP) | 0.025 | | | | |
| 6 | Lens 3 | 1.395660(ASP) | 0.869 | Plastic | 1.544 | 55.9 | 0.77 |
| 7 | | −0.470230(ASP) | 0.163 | | | | |
| 8 | Lens 4 | −0.297430(ASP) | 0.333 | plastic | 1.650 | 21.4 | −1.23 |
| 9 | | −0.682570(ASP) | 0.400 | | | | |
| 10 | IR-filter | Plano | 0.400 | Glass | 1.516 | 64.1 | — |
| 11 | | Plano | 0.275 | | | | |
| 12 | Image | Plano | — | | | | |

Note:
Reference wavelength is d-line 587.6 nm

In Table 4-1, from the first lens element 410 to the sixth lens element 460, all lenses can be aspherical, and the aspheric surfaces can satisfy Condition ASP, but are not limited thereto. As for the parameters of the aspheric surfaces, reference is made to Table 4-2 below.

TABLE 4-2

Aspheric Coefficients

| Surface | 1 | 2 | 4 | 5 |
|---|---|---|---|---|
| k = | −1.00000E+00 | −9.00000E+01 | 1.51941E+00 | 1.11498E+00 |
| $A_4$ = | 1.52857E−01 | 4.34004E−01 | 3.35898E−01 | −5.95125E−01 |
| $A_6$ = | −7.16901E−02 | −6.49073E−01 | −6.29372E+00 | 4.18967E+00 |
| $A_8$ = | 2.29133E−02 | 4.80648E−01 | 9.88705E+01 | −2.22271E+00 |
| $A_{10}$ = | −3.23200E−03 | −1.40149E−01 | −8.14405E+02 | −1.43212E+01 |
| $A_{12}$ = | — | — | 1.80803E+03 | 1.06344E−01 |
| $A_{14}$ = | — | — | 1.28957E−07 | 1.01088E−07 |

| Surface | 6 | 7 | 8 | 9 |
|---|---|---|---|---|
| k = | −3.65197E+01 | −3.41340E+00 | −2.36690E+00 | −3.46189E+00 |
| $A_4$ = | 3.73708E−01 | −8.08377E−01 | 4.23770E−01 | 9.77472E−01 |
| $A_6$ = | −4.37205E−01 | 1.56112E+00 | −1.08149E+00 | −1.36690E+00 |
| $A_8$ = | 6.11229E−01 | −1.66113E+00 | 1.52673E+00 | 1.03979E+00 |
| $A_{10}$ = | −2.63150E−01 | 1.77279E+00 | −4.58263E−01 | −3.04539E−01 |

The content of Table 4-3 may be deduced from Table 4-1.

TABLE 4-3

Embodiment 4

| f (mm) | 1.29 | $(R_5 + R_6)/(R_5 − R_6)$ | 0.50 |
|---|---|---|---|
| Fno | 2.60 | $CT_2/CT_1$ | 0.37 |
| HFOV(deg.) | 44.9 | $T_{34}/CT_4$ | 0.49 |
| $V_3 − V_4$ | 34.5 | $|f/f_2|$ | 0.09 |
| $R_1/R_2$ | 0.46 | $f/f_3$ | 1.67 |

TABLE 4-3-continued

Embodiment 4

| $R_7/R_6$ | 0.63 | SL/TTL | 0.66 |
|---|---|---|---|
| $R_7/R_8$ | 0.44 | | |

FIG. 4B is a schematic view of longitudinal spherical aberration curves when the lights having a wavelength of 486.1 nm, 587.6 nm, and 656.3 nm are respectively projected in the optical lens assembly for image taking 40 in FIG. 4A. It can be observed from FIG. 4B that, when the different wavelengths, 486.1 nm, 587.6 nm, and 656.3 nm, of the light are received by the optical lens assembly for image taking 40, the longitudinal spherical aberrations generated by the optical lens assembly for image taking 40 are within a range of 0.0 mm to 0.04 mm.

FIG. 4C is a schematic view of astigmatic field curves when the light having the wavelength of 587.6 nm is projected in the optical lens assembly for image taking in FIG. 4A. It can be observed from FIG. 4C that when the light having the wavelength of 587.6 nm is projected in the optical lens assembly for image taking 40, the astigmatic field curvature of the tangential plane generated is within a range of 0.0 mm to 0.090 mm, and the astigmatic field curvature of the sagittal plane generated is within a range of 0.0 mm to 0.040 mm.

FIG. 4D is a schematic view of a distortion curve when the light having the wavelength of 587.6 nm is projected in the optical lens assembly for image taking in FIG. 4A. It can be observed from FIG. 4D that, the distortion ratio generated when the light having the wavelength of 587.6 nm is projected in the optical lens assembly for image taking 40 is within a range of −1.5% to 0.1%. As shown in FIGS. 4B to 4D, the optical lens assembly for image taking 40, designed according to the fourth embodiment, is capable of effectively correcting various aberrations.

The Fifth Embodiment (Embodiment 5)

Figure 5A:
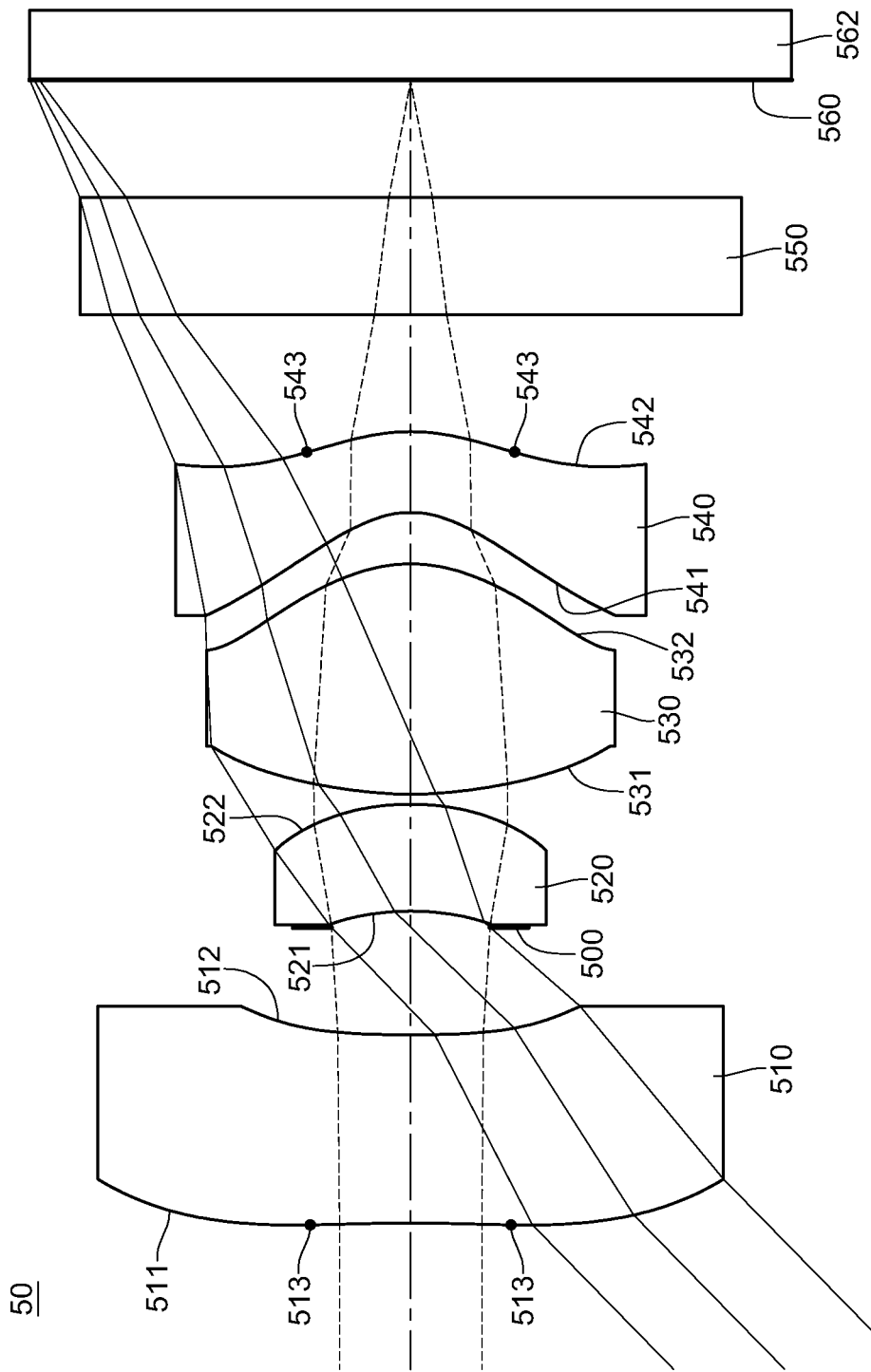
FIG. 5A is a schematic structural view of a fifth embodiment of an optical lens assembly for image taking according to the disclosure.

FIG. 5A is a schematic structural view of a fifth embodiment of an optical lens assembly for image taking 50. The specific implementation and elements of the fifth embodiment are substantially the same as that in the first embodiment. The element symbols in the fifth embodiment all begin with "5", which correspond to those in the first embodiment with the same function or structure. For conciseness, only the differences are illustrated below, and the similarities will not be repeated herein.

In this embodiment, for example, the wavelength of the light received by the optical lens assembly for image taking 50 is 587.6 nm, but the wavelength may be altered according to actual requirements, and is not limited to the wavelength value mentioned above.

In this embodiment, a first lens element 510 with negative refractive power comprises a concave object-side surface 511 and two inflection points 513. A second lens element 520 with positive refractive power comprises a concave object-side surface 521 and a convex image-side surface 522. A third lens element 530 with positive refractive power comprises a convex image-side surface 532. A fourth lens element 540 with negative refractive power comprises a concave object-side surface 521, a convex image-side surface 522, and two inflection points 543. A stop 500 which is an aperture stop in this embodiment is disposed between the first lens element 510 and the second lens element 520.

The detailed data of the optical lens assembly for image taking 50 is as shown in Table 5-1 below.

TABLE 5-1

Embodiment 5
f = 1.31 mm, Fno = 2.70, HFOV = 44.3 deg.

| Surface# | Member | Radius Curvature (mm) | Thickness (mm) | Material | Index | Abbe # | Focal length |
|---|---|---|---|---|---|---|---|
| 0 | Object | Plano | Infinity | | | | |
| 1 | Lens 1 | −5.652900(ASP) | 0.644 | Plastic | 1.544 | 55.9 | −5.36 |
| 2 | | 6.258000(ASP) | 0.367 | | | | |
| 3 | Ape. Stop | Plano | 0.055 | | | | |
| 4 | Lens 2 | −0.935130(ASP) | 0.365 | Plastic | 1.544 | 55.9 | 21.53 |
| 5 | | −0.985130(ASP) | 0.035 | | | | |
| 6 | Lens 3 | 1.214560(ASP) | 0.787 | Plastic | 1.544 | 55.9 | 0.80 |
| 7 | | −0.520640(ASP) | 0.176 | | | | |
| 8 | Lens 4 | −0.317800(ASP) | 0.276 | Plastic | 1.650 | 21.4 | −1.37 |
| 9 | | −0.663790(ASP) | 0.400 | | | | |
| 10 | IR-filter | Plano | 0.400 | Glass | 1.516 | 64.1 | — |
| 11 | | Plano | 0.402 | | | | |
| 12 | Image Plane | Plano | — | | | | |

Note:
Reference wavelength is d-line 587.6 nm

In Table 5-1, from the first lens element 510 to the sixth lens element 560, all lenses can be aspherical, and the aspheric surfaces can satisfy Condition ASP, but are not limited thereto. As for the parameters of the aspheric surfaces, reference is made to Table 5-2 below.

TABLE 5-2

Aspheric Coefficients

| Surface# | 1 | 2 | 4 | 5 |
|---|---|---|---|---|
| k = | −1.00000E+00 | −3.67935E+01 | 2.78980E+00 | 1.83351E+00 |
| $A_4$ = | 3.40290E−01 | 9.61744E−01 | 2.03820E−02 | −1.68158E+00 |
| $A_6$ = | −2.67343E−01 | −1.61800E+00 | −3.91866E+00 | 1.35945E+01 |
| $A_8$ = | 1.76741E−01 | 4.18070E+00 | 6.74814E+01 | −5.04388E+01 |
| $A_{10}$ = | −4.85097E−02 | −6.61421E+00 | −5.82105E+02 | 5.96977E+01 |
| $A_{12}$ = | — | — | 5.17264E−06 | 2.04408E−06 |
| $A_{14}$ = | — | — | 2.10649E−06 | 2.10756E−06 |

| Surface# | 6 | 7 | 8 | 9 |
|---|---|---|---|---|
| k = | −3.95469E+01 | −3.18456E+00 | −2.03504E+00 | −2.57273E+00 |

TABLE 5-2-continued

Aspheric Coefficients

| | | | | |
|---|---|---|---|---|
| $A_4 =$ | 4.92033E−01 | −7.80398E−01 | 6.12850E−01 | 1.11177E+00 |
| $A_6 =$ | −5.66676E−01 | 1.62810E+00 | −8.22225E−01 | −1.22492E+00 |
| $A_8 =$ | 8.23936E−01 | −5.90968E−01 | 1.10562E+00 | 7.40234E−01 |
| $A_{10} =$ | −2.48604E−01 | 9.34098E−01 | −7.29867E−01 | −2.51425E−01 |

The content of Table 5-3 may be deduced from Table 5-1.

TABLE 5-3

Embodiment 5

| | | | |
|---|---|---|---|
| f (mm) | 1.31 | $(R_5 + R_6)/(R_5 − R_6)$ | 0.40 |
| Fno | 2.70 | $CT_2/CT_1$ | 0.57 |
| HFOV(deg.) | 44.3 | $T_{34}/CT_4$ | 0.64 |
| $V_3 − V_4$ | 34.5 | $|f/f_2|$ | 0.06 |
| $R_1/R_2$ | −0.90 | $f/f_3$ | 1.64 |
| $R_7/R_6$ | 0.61 | SL/TTL | 0.73 |
| $R_7/R_8$ | 0.48 | | |

FIG. 5B is a schematic view of longitudinal spherical aberration curves when the lights having wavelengths of 486.1 nm, 587.6 nm, and 656.3 nm are respectively projected in the optical lens assembly for image taking 50 in FIG. 5A. It can be observed from FIG. 5B that, when the different wavelengths, 486.1 nm, 587.6 nm, and 656.3 nm, of the light are received by the optical lens assembly for image taking 50, the longitudinal spherical aberrations generated by the optical lens assembly for image taking 50 are within a range of −0.005 m to 0.040 m.

FIG. 5C is a schematic view of astigmatic field curves when the light having the wavelength of 587.6 nm is projected in the optical lens assembly for image taking in FIG. 5A. It can be observed from FIG. 5C that, when the light having the wavelength of 587.6 nm is projected in the optical lens assembly for image taking 50, the astigmatic field curvature of the tangential plane generated is within a range of 0.0 mm to 0.060 mm, and the astigmatic field curvature of the sagittal plane generated is within a range of 0.0 mm to 0.030 mm.

FIG. 5D is a schematic view of a distortion curve when the light having the wavelength of 587.6 nm is projected in the optical lens assembly for image taking in FIG. 5A. It can be observed from FIG. 5D that, the distortion ratio generated when the light having the wavelength of 587.6 nm is projected in the optical lens assembly for image taking 50 is within a range of −1.5% to 0.1%. As shown in FIGS. 5B to 5D, the optical lens assembly for image taking 50, designed according to the fifth embodiment, is capable of effectively correcting various aberrations.

The Sixth Embodiment (Embodiment 6)

Figure 6A:
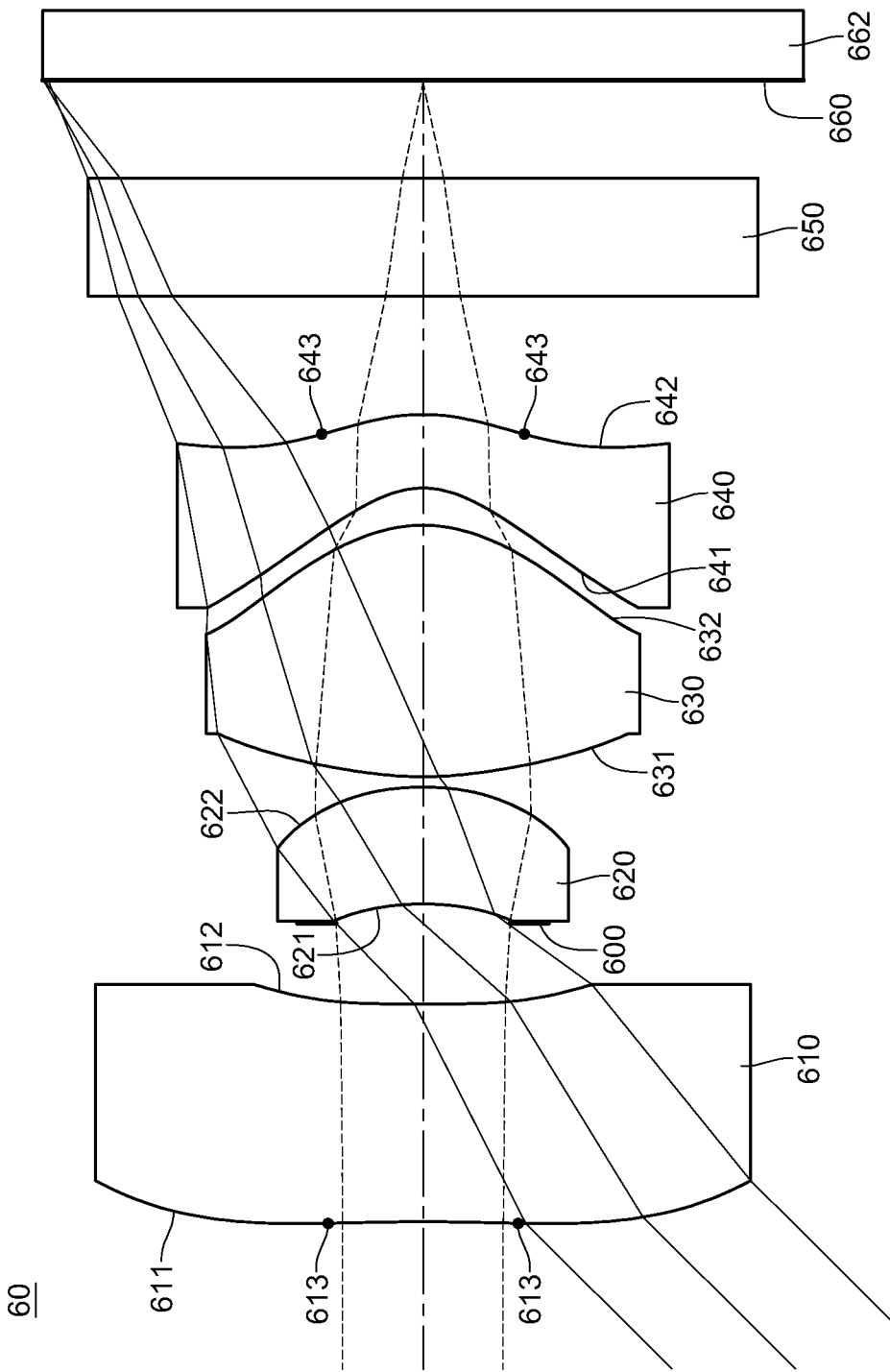
FIG. 6A is a schematic structural view of a sixth embodiment of an optical lens assembly for image taking according to the disclosure.

FIG. 6A is a schematic structural view of a sixth embodiment of an optical lens assembly for image taking 60. The specific implementation and elements of the sixth embodiment are substantially the same as that in the first embodiment. The element symbols in the sixth embodiment all begin with "6", which correspond to those in the first embodiment with the same function or structure. For conciseness, only the differences are illustrated below, and the similarities will not be repeated herein.

In this embodiment, for example, the wavelength of the light received by the optical lens assembly for image taking 60 is 587.6 nm, but the wavelength may be altered according to actual requirements, and is not limited to the wavelength value mentioned above.

In this embodiment, a first lens element 610 with negative refractive power comprises a concave object-side surface 611 and two inflection points 613. A second lens element 620 with positive refractive power comprises a concave object-side surface 621 and a convex image-side surface 622. A third lens element 630 with positive refractive power comprises a convex image-side surface 632. A fourth lens element 640 with negative refractive power comprises a concave object-side surface 641, a convex image-side surface 642, and two inflection points 643. A stop 600 which is an aperture stop in this embodiment is disposed between the first lens element 610 and the second lens element 620.

The detailed data of the optical lens assembly for image taking 60 is as shown in Table 6-1 below.

TABLE 6-1

Embodiment 6
f = 1.28 mm, Fno = 2.35, HFOV = 45.1 deg.

| Surface# | Member | Radius Curvature (mm) | Thickness (mm) | Material | Index | Abbe # | Focal length |
|---|---|---|---|---|---|---|---|
| 0 | Object | Plano | Infinity | | | | |
| 1 | Lens 1 | −5.724900(ASP) | 0.737 | Plastic | 1.544 | 55.9 | −7.51 |
| 2 | | 14.949800(ASP) | 0.274 | | | | |
| 3 | Ape. Stop | Plano | 0.066 | | | | |
| 4 | Lens 2 | −0.902380(ASP) | 0.396 | Plastic | 1.544 | 55.9 | 17.64 |
| 5 | | −0.952380(ASP) | 0.035 | | | | |
| 6 | Lens 3 | 1.105030(ASP) | 0.853 | Plastic | 1.544 | 55.9 | 0.78 |
| 7 | | −0.499100(ASP) | 0.126 | | | | |
| 8 | Lens 4 | −0.296060(ASP) | 0.250 | Plastic | 1.633 | 23.4 | −1.25 |
| 9 | | −0.626530(ASP) | 0.400 | | | | |
| 10 | IR-filter | Plano | 0.400 | Glass | 1.516 | 64.1 | — |
| 11 | | Plano | 0.332 | | | | |
| 12 | Image Plane | Plano | — | | | | |

Note:
Reference wavelength is d-line 587.6 nm

In Table 6-1, from the first lens element 610 to the sixth lens element 660, all lenses are aspherical, and the aspheric surfaces can satisfy Condition ASP, but are not limited thereto. As for the parameters of the aspheric surfaces, reference is made to Table 6-2 below.

TABLE 6-2

Aspheric Coefficients

| Surface# | 1 | 2 | 4 | 5 |
|---|---|---|---|---|
| k = | −1.00000E+00 | −9.00000E+01 | 2.55908E+00 | 2.20613E+00 |
| $A_4$ = | 3.00257E−01 | 1.01094E+00 | 6.13323E−02 | −1.91489E+00 |
| $A_6$ = | −2.43782E−01 | −2.53707E+00 | −4.10802E+00 | 1.42041E+01 |
| $A_8$ = | 1.62434E−01 | 5.79950E+00 | 8.62283E+01 | −4.89796E+01 |
| $A_{10}$ = | −4.49697E−02 | −8.05769E+00 | −7.58625E+02 | 6.67499E+01 |
| $A_{12}$ = | — | — | 2.47314E+02 | 4.92442E−06 |
| $A_{14}$ = | — | — | 3.19074E−06 | 3.14779E−06 |

| Surface# | 6 | 7 | 8 | 9 |
|---|---|---|---|---|
| k = | −3.30955E+01 | −2.88973E+00 | −2.00387E+00 | −3.56455E+00 |
| $A_4$ = | 3.62608E−01 | −8.01187E−01 | 5.56140E−01 | 1.08734E+00 |
| $A_6$ = | −5.71917E−01 | 1.56821E+00 | −8.72390E−01 | −1.30167E+00 |
| $A_8$ = | 8.15897E−01 | −8.25253E−01 | 1.07419E+00 | 7.68980E−01 |
| $A_{10}$ = | −4.32034E−01 | 4.17135E−01 | −6.48163E−01 | −2.16572E−01 |

The content of Table 6-3 may be deduced from Table 6-1.

TABLE 6-3

Embodiment 6

| f (mm) | 1.28 | $(R_5 + R_6)/(R_5 - R_6)$ | 0.38 |
|---|---|---|---|
| Fno | 2.35 | $CT_2/CT_1$ | 0.54 |
| HFOV(deg.) | 45.1 | $T_{34}/CT_4$ | 0.50 |
| $V_3 - V_4$ | 32.5 | $|f/f_2|$ | 0.07 |
| $R_1/R_2$ | −0.38 | $f/f_3$ | 1.65 |
| $R_7/R_6$ | 0.59 | SL/TTL | 0.73 |
| $R_7/R_8$ | 0.47 | | |

FIG. 6B is a schematic view of longitudinal spherical aberration curves when the lights having wavelengths of 486.1 nm, 587.6 nm, and 656.3 nm are respectively projected in the optical lens assembly for image taking 60 in FIG. 6A. It can be observed from FIG. 6B that, when the different wavelengths, 486.1 nm, 587.6 nm, and 656.3 nm, of the light are received by the optical lens assembly for image taking 60, the longitudinal spherical aberrations generated by the optical lens assembly for image taking 60 are within a range of −0.010 m to 0.050 m.

FIG. 6C is a schematic view of astigmatic field curves when the light having the wavelength of 587.6 nm is projected in the optical lens assembly for image taking in FIG. 6A. It can be observed from FIG. 6C that, when the light having the wavelength of 587.6 nm is projected in the optical lens assembly for image taking 60, the astigmatic field curvature of the tangential plane generated is within a range of −0.010 mm to 0.12 mm, and the astigmatic field curvature of the sagittal plane generated is within a range of −0.025 mm to 0.025 mm.

FIG. 6D is a schematic view of a distortion curve when the light having the wavelength of 587.6 nm is projected in the optical lens assembly for image taking in FIG. 6A. It can be observed from FIG. 6D that, the distortion ratio generated when the light having the wavelength of 587.6 nm is projected in the optical lens assembly for image taking 60 is within a range of −1.5% to 0.5%. As shown in FIGS. 6B to 6D, the optical lens assembly for image taking 60, designed according to the sixth embodiment, is capable of effectively correcting various aberrations.

The Seventh Embodiment (Embodiment 7)

Figure 7A:
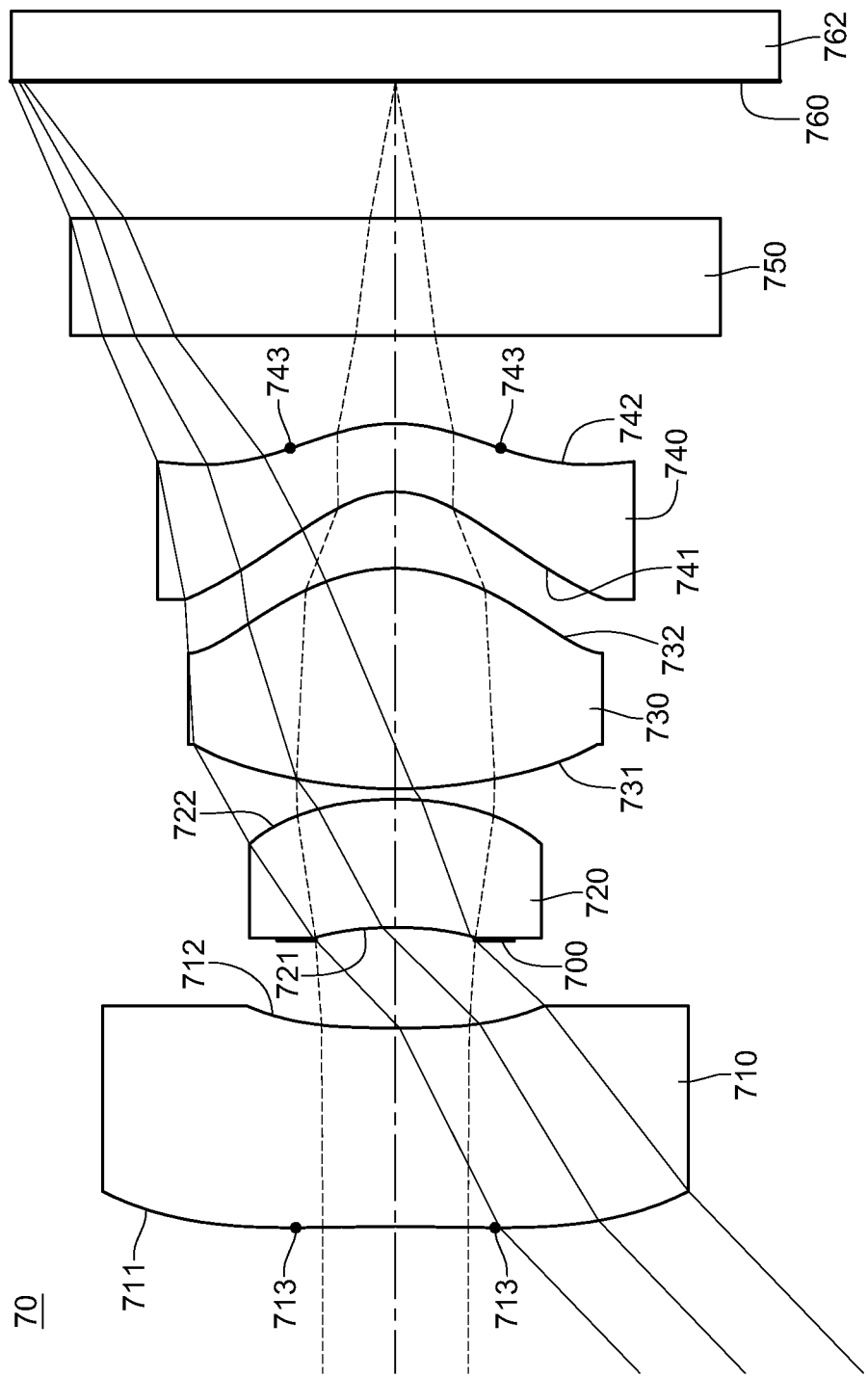
FIG. 7A is a schematic structural view of a seventh embodiment of an optical lens assembly for image taking according to the disclosure.

FIG. 7A is a schematic structural view of a seventh embodiment of an optical lens assembly for image taking 70. The specific implementation and elements of the seventh embodiment are substantially the same as that in the first embodiment. The element symbols in the seventh embodiment all begin with "7", which correspond to those in the first embodiment with the same function or structure. For conciseness, only the differences are illustrated below, and the similarities will not be repeated herein.

In this embodiment, for example, the wavelength of the light received by the optical lens assembly for image taking 70 is 587.6 nm, but the wavelength may be altered according to actual requirements, and is not limited to the wavelength value mentioned above.

In this embodiment, a first lens element 710 with negative refractive power comprises a concave object-side surface 711 and two inflection points 713. A second lens element 720 with positive refractive power comprises a concave object-side surface 721 and a convex image-side surface 722. A third lens element 730 with positive refractive power comprises a convex image-side surface 732. A fourth lens element 740 with negative refractive power comprises a concave object-side surface 741, a convex image-side surface 742, and two inflection points 743. A stop 700 which is an aperture stop in this embodiment is disposed between the first lens element 710 and the second lens element 720.

The detailed data of the optical lens assembly for image taking 70 is as shown in Table 7-1 below.

TABLE 7-1

Embodiment 7
f = 1.34 mm, Fno = 2.70, HFOV = 43.9 deg.

| Surface# | Member | Radius Curvature (mm) | Thickness (mm) | Material | Index | Abbe # | Focal length |
|---|---|---|---|---|---|---|---|
| 0 | Object | Plano | Infinity | | | | |
| 1 | Lens 1 | −7.142900(ASP) | 0.677 | Plastic | 1.544 | 55.9 | −5.00 |
| 2 | | 4.545500(ASP) | 0.299 | | | | |
| 3 | Ape. Stop | Plano | 0.045 | | | | |
| 4 | Lens 2 | −1.184040(ASP) | 0.437 | Plastic | 1.544 | 55.9 | 37.84 |
| 5 | | −1.265280(ASP) | 0.035 | | | | |
| 6 | Lens 3 | 1.279590(ASP) | 0.753 | Plastic | 1.544 | 55.9 | 0.87 |
| 7 | | −0.596240(ASP) | 0.261 | | | | |
| 8 | Lens 4 | −0.310340(ASP) | 0.233 | Plastic | 1.650 | 21.4 | −1.67 |
| 9 | | −0.563730(ASP) | 0.300 | | | | |
| 10 | IR-filter | Plano | 0.400 | Glass | 1.516 | 64.1 | — |
| 11 | | Plano | 0.468 | | | | |
| 12 | Image Plane | Plano | — | | | | |

Note:
Reference wavelength is d-line 587.6 nm

In Table 7-1, from the first lens element 710 to the sixth lens element 760, all lenses can be aspheric, and the aspheric surfaces can satisfy Condition ASP, but are not limited thereto. As for the parameters of the aspheric surfaces, reference is made to Table 7-2 below.

TABLE 7-2

Aspheric Coefficients

| Surface# | 1 | 2 | 4 | 5 |
|---|---|---|---|---|
| k = | −1.00000E+00 | −1.35594E−01 | 2.10353E+00 | 3.49926E+00 |
| $A_4$ = | 3.19193E−01 | 1.01549E+00 | −1.93069E−01 | −1.57942E+00 |
| $A_6$ = | −2.49212E−01 | −1.98488E+00 | −2.33023E+00 | 1.29237E+01 |
| $A_8$ = | 1.71702E−01 | 6.57059E+00 | 6.29833E+01 | −4.89992E+01 |
| $A_{10}$ = | −5.12241E−02 | −1.33479E+01 | −1.15796E+03 | 6.20969E+01 |
| $A_{12}$ = | — | — | 4.35204E+03 | −1.06874E−04 |
| $A_{14}$ = | — | — | 5.05748E−06 | 5.05933E−06 |

| Surface# | 6 | 7 | 8 | 9 |
|---|---|---|---|---|
| k = | −4.34874E+01 | −3.40008E+00 | −1.85716E+00 | −2.07601E+00 |
| $A_4$ = | 4.29783E−01 | −8.42186E−01 | 7.73441E−01 | 1.32443E+00 |
| $A_6$ = | −5.89216E−01 | 1.56068E+00 | −8.94962E−01 | −1.33912E+00 |
| $A_8$ = | 9.40249E−01 | −5.66746E−01 | 8.35023E−01 | 6.13216E−01 |
| $A_{10}$ = | −3.33283E−01 | 1.02426E+00 | −4.51384E−01 | −1.54247E−01 |

The content of Table 7-3 may be deduced from Table 7-1.

TABLE 7-3

Embodiment 7

| f (mm) | 1.34 | $(R_5 + R_6)/(R_5 - R_6)$ | 0.36 |
|---|---|---|---|
| Fno | 2.70 | $CT_2/CT_1$ | 0.65 |
| HFOV(deg.) | 43.9 | $T_{34}/CT_4$ | 1.12 |

TABLE 7-3-continued

Embodiment 7

| $V_3 - V_4$ | 34.5 | $|f/f_2|$ | 0.04 |
|---|---|---|---|
| $R_1/R_2$ | −1.57 | $f/f_3$ | 1.54 |

TABLE 7-3-continued

Embodiment 7

| $R_7/R_6$ | 0.52 | SL/TTL | 0.74 |
|---|---|---|---|
| $R_7/R_8$ | 0.55 | | |

FIG. 7B is a schematic view of longitudinal spherical aberration curves when the lights having wavelengths of 486.1 nm, 587.6 nm, and 656.3 nm are respectively projected in the optical lens assembly for image taking 70 in FIG. 7A. It can be observed from FIG. 7B that, when the different wavelengths, 486.1 nm, 587.6 nm, and 656.3 nm, of the light are received by the optical lens assembly for image taking 70, the longitudinal spherical aberrations generated by the optical lens assembly for image taking 70 are within a range of −0.015 m to 0.040 m.

FIG. 7C is a schematic view of astigmatic field curves when the light having the wavelength of 587.6 nm is projected in the optical lens assembly for image taking in FIG. 7A. It can be observed from FIG. 7C that, when the light having the wavelength of 587.6 nm is projected in the optical lens assembly for image taking 70, the astigmatic field curvature of the tangential plane generated is within a range of −0.030 mm to 0.060 mm, and the astigmatic field curvature of the sagittal plane generated is within a range of −0.025 mm to 0.025 mm.

FIG. 7D is a schematic view of a distortion curve when the light having the wavelength of 587.6 nm is projected in the optical lens assembly for image taking in FIG. 7A. It can be observed from FIG. 7D that, the distortion ratio generated when the light having the wavelength of 587.6 nm is projected in the optical lens assembly for image taking 70 is within a range of −1.5% to 0.5%. As shown in FIGS. 7B to 7D, the optical lens assembly for image taking 70, designed according to the seventh embodiment, is capable of effectively correcting various aberrations.

The Eighth Embodiment (Embodiment 8)

Figure 8A:
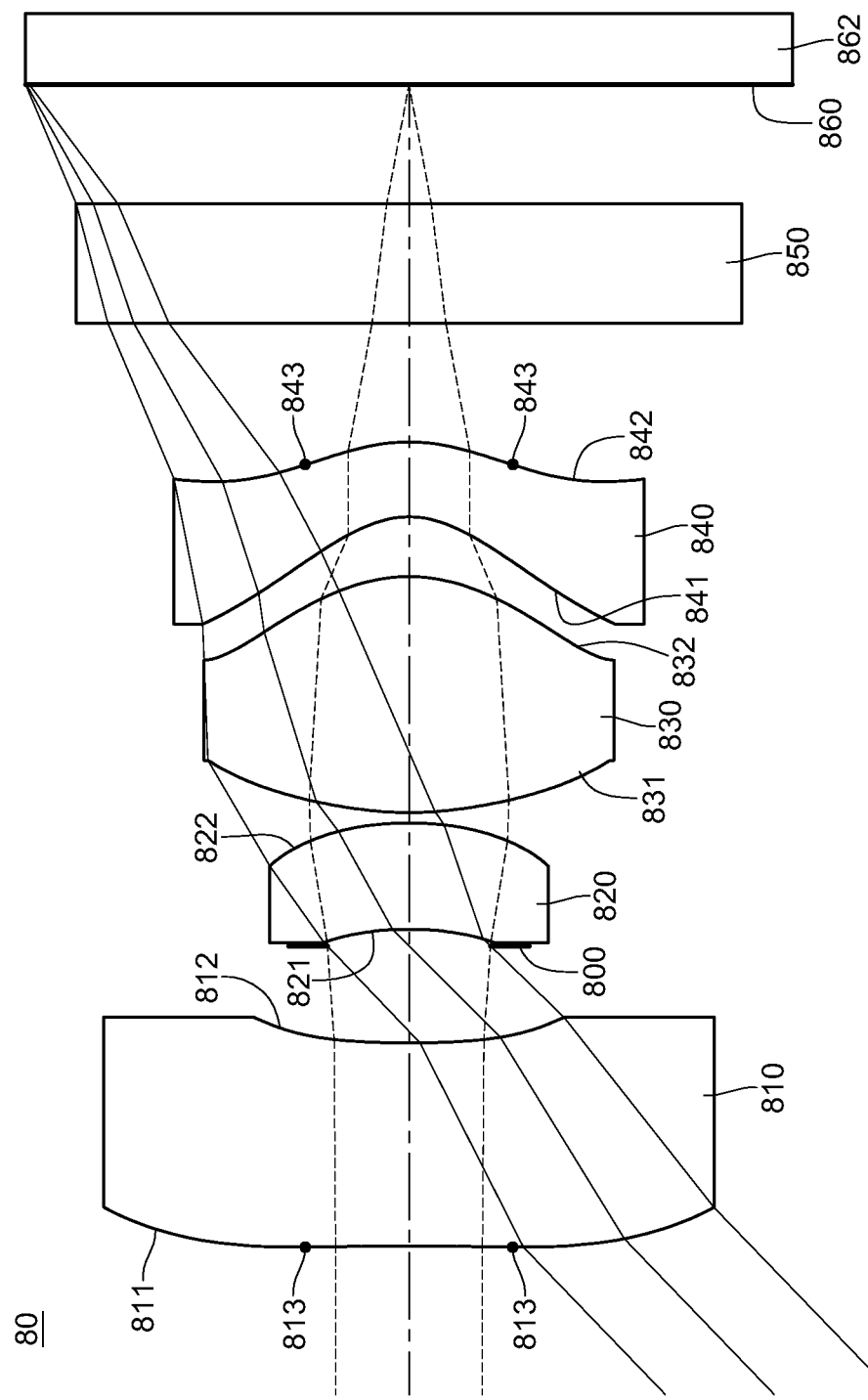
FIG. 8A is a schematic structural view of a eighth embodiment of an optical lens assembly for image taking according to the disclosure.

FIG. 8A is a schematic structural view of an eighth embodiment of an optical lens assembly for image taking 80. The specific implementation and elements of the eighth embodiment are substantially the same as that in the first embodiment. The element symbols in the eighth embodiment all begin with "8", which correspond to those in the first embodiment with the same function or structure. For conciseness, only the differences are illustrated below, and the similarities will not be repeated herein.

In this embodiment, for example, the wavelength of the light received by the optical lens assembly for image taking 80 is 587.6 nm, but the wavelength may be altered according to actual requirements, and is not limited to the wavelength value mentioned above.

In this embodiment, a first lens element 810 with negative refractive power comprises a concave object-side surface 811 and two inflection points 813. A second lens element 820 with negative refractive power comprises a concave object-side surface 821 and a convex image-side surface 822. A third lens element 830 with positive refractive power comprises a convex image-side surface 832. A fourth lens element 840 with negative refractive power comprises a concave object-side surface 841, a convex image-side surface 842, and two inflection points 843. A stop 800 which is an aperture stop in this embodiment is disposed between the first lens element 810 and the second lens element 820.

The detailed data of the optical lens assembly for image taking 80 is as shown in Table 8-1 below.

TABLE 8-1

Embodiment 8
f = 1.33 mm, Fno = 2.70, HFOV = 43.9 deg.

| Surface# | Member | Radius Curvature (mm) | Thickness (mm) | Material | Index | Abbe # | Focal length |
|---|---|---|---|---|---|---|---|
| 0 | Object | Plano | Infinity | | | | |
| 1 | Lens 1 | −6.914400(ASP) | 0.683 | Plastic | 1.544 | 55.9 | −4.87 |
| 2 | | 4.447100(ASP) | 0.325 | | | | |
| 3 | Ape. Stop | Plano | 0.057 | | | | |
| 4 | Lens 2 | −1.015000(ASP) | 0.357 | Plastic | 1.544 | 55.9 | −36.26 |
| 5 | | −1.202670(ASP) | 0.035 | | | | |
| 6 | Lens 3 | 1.069910(ASP) | 0.794 | Plastic | 1.544 | 55.9 | 0.80 |
| 7 | | −0.542450(ASP) | 0.201 | | | | |
| 8 | Lens 4 | −0.306030(ASP) | 0.252 | Plastic | 1.650 | 21.4 | −1.46 |
| 9 | | −0.597690(ASP) | 0.400 | | | | |
| 10 | IR-filter | Plano | 0.400 | Glass | 1.516 | 64.1 | — |
| 11 | | Plano | 0.401 | | | | |
| 12 | Image Plane | Plano | — | | | | |

Note:
Reference wavelength is d-line 587.6 nm

In Table 8-1, from the first lens element 810 to the sixth lens element 860, all lenses can be aspheric, and the aspheric surfaces can satisfy Condition ASP, but are not limited thereto. As for the parameters of the aspheric surfaces, reference is made to Table 8-2 below.

TABLE 8-2

Aspheric Coefficients

| Surface# | 1 | 2 | 4 | 5 |
|---|---|---|---|---|
| k = | −1.00000E+00 | −8.65388E+00 | 1.37142E+00 | 4.15149E+00 |
| $A_4$ = | 3.12850E−01 | 1.05190E+00 | −1.22652E−01 | −1.69375E+00 |
| $A_6$ = | −2.37536E−01 | −2.13079E+00 | −3.27823E+00 | 1.35226E+01 |
| $A_8$ = | 1.58715E−01 | 7.76796E+00 | 8.45481E+01 | −4.95587E+01 |
| $A_{10}$ = | −4.51918E−02 | −1.43450E+01 | −1.26551E+03 | 6.30873E+01 |

TABLE 8-2-continued

| Aspheric Coefficients | | | | |
|---|---|---|---|---|
| $A_{12}=$ | — | — | 3.87189E+03 | −1.07715E−04 |
| $A_{14}=$ | — | — | 5.30644E−06 | 5.30970E−06 |

| Surface# | 6 | 7 | 8 | 9 |
|---|---|---|---|---|
| k = | −2.71296E+01 | −3.17823E+00 | −1.85517E+00 | −1.95965E+00 |
| $A_4=$ | 4.92735E−01 | −7.66561E−01 | 7.90823E−01 | 1.32290E+00 |
| $A_6=$ | −5.62301E−01 | 1.62937E+00 | −9.69149E−01 | −1.33002E+00 |
| $A_8=$ | 8.05526E−01 | −5.72860E−01 | 8.18526E−01 | 6.29672E−01 |
| $A_{10}=$ | −2.70488E−01 | 1.09609E+00 | −2.76973E−01 | −1.75682E−01 |

The content of Table 8-3 may be deduced from Table 8-1.

TABLE 8-3

| Embodiment 8 | | | |
|---|---|---|---|
| f (mm) | 1.33 | $(R_5+R_6)/(R_5-R_6)$ | 0.33 |
| Fno | 2.70 | $CT_2/CT_1$ | 0.52 |
| HFOV(deg.) | 43.9 | $T_{34}/CT_4$ | 0.80 |
| $V_3-V_4$ | 34.5 | $|f/f_2|$ | −0.04 |
| $R_1/R_2$ | −1.55 | $f/f_3$ | 1.67 |
| $R_7/R_6$ | 0.56 | SL/TTL | 0.73 |
| $R_7/R_8$ | 0.51 | | |

FIG. 8B is a schematic view of longitudinal spherical aberration curves when the lights having wavelengths of 486.1 nm, 587.6 nm, and 656.3 nm are respectively projected in the optical lens assembly for image taking 80 in FIG. 8A. It can be observed from FIG. 8B that, when the different wavelengths, 486.1 nm, 587.6 nm, and 656.3 nm, of the light are received by the optical lens assembly for image taking 80, the longitudinal spherical aberrations generated by the optical lens assembly for image taking 80 are within a range of −0.015 m to 0.040 m.

FIG. 8C is a schematic view of astigmatic field curves when the light having the wavelength of 587.6 nm is projected in the optical lens assembly for image taking in FIG. 8A. It can be observed from FIG. 8C that, when the light having the wavelength of 587.6 nm is projected in the optical lens assembly for image taking 80, the astigmatic field curvature of the tangential plane generated is within a range of 0.0 mm to 0.050 mm, and the astigmatic field curvature of the sagittal plane generated is within a range of −0.010 mm to 0.025 mm.

FIG. 8D is a schematic view of a distortion curve when the light having the wavelength of 587.6 nm is projected in the optical lens assembly for image taking in FIG. 8A. It can be observed from FIG. 8D that, the distortion ratio generated when the light having the wavelength of 587.6 nm is projected in the optical lens assembly for image taking 80 is within a range of −1.5% to 0.1%. As shown in FIGS. 8B to 8D, the optical lens assembly for image taking 80, designed according to the eighth embodiment, is capable of effectively correcting various aberrations.

What is claimed is:

1. An optical lens assembly for image taking comprising, in order from an object side to an image side:
 a front lens group further comprising a first lens element with negative refractive power having a concave object-side surface;
 a stop; and
 a rear lens group comprising, in order from the object side to the image side:
 a second lens element with positive refractive power having a concave object-side surface and a convex image-side surface;
 a third lens element with positive refractive power; and
 a fourth lens element with negative refractive power having a concave object-side surface and a convex image-side surface, and at least one of the object side-surface and the image-side surface of the fourth lens element being aspheric;
 the optical lens assembly for image taking satisfies the following conditions:

$$-3.0<R_1/R_2<0.9;$$

$$1.2<f/f_3<2.0$$

wherein, $R_1$ is a radius of curvature of the object-side surface of the first lens element, $R_2$ is a radius of curvature of the image-side surface of the first lens element, f is a focal length of the optical lens assembly for image taking, and $f_3$ is a focal length of the third lens element.

2. The optical lens assembly for image taking according to claim 1, wherein the third lens element comprises a convex image-side surface; the image-side surface and the object-side surface of the fourth lens element are both aspheric, the fourth lens element comprises at least one inflection point, and the fourth lens element is made of plastic.

3. The optical lens assembly for image taking according to claim 2, wherein the optical lens assembly for image taking satisfies the following condition:

$$0.1<(R_5+R_6)/(R_5-R_6)<0.8$$

Wherein $R_5$ is a radius of curvature of the object-side surface of the third lens element, and $R_6$ is a radius of curvature of the image-side surface of the third lens element.

4. The optical lens assembly for image taking according to claim 3, wherein the optical lens assembly for image taking satisfies the following condition:

$$0.1<R_7/R_8<0.8$$

wherein $R_7$ is a radius of curvature of the object-side surface of the fourth lens element, and $R_8$ is a radius of curvature of the image-side surface of the fourth lens element.

5. The optical lens assembly for image taking according to claim 4, wherein the optical lens assembly for image taking satisfies the following condition:

$$23<V_3-V_4<45$$

wherein $V_3$ is an Abbe number of the third lens element, and $V_4$ is an Abbe number of the fourth lens element.

6. The optical lens assembly for image taking according to claim 3, wherein the optical lens assembly for image taking satisfies the following condition:

$$0.15<T_{34}/CT_4<1.5$$

wherein $T_{34}$ is an axial distance between the third lens element and the fourth lens element, and $CT_4$ is a central thickness of the fourth lens element.

7. The optical lens assembly for image taking according to claim 3, wherein the optical lens assembly for image taking satisfies the following condition:

$$|f/f_2|<0.20$$

wherein f is a focal length of the optical lens assembly for image taking, and $f_2$ is a focal length of the second lens element.

8. The optical lens assembly for image taking according to claim 3, further comprising an image plane and the optical lens assembly for image taking satisfying the following condition:

$$0.5<SL/TTL<0.9$$

wherein SL is an axial distance between the stop and the image plane, and TTL is an axial distance between the object-side surface of the first lens element and the image plane.

9. The optical lens assembly for image taking according to claim 3, wherein the optical lens assembly for image taking satisfies the following condition:

$$30<V_3-V_4<42$$

wherein $V_3$ is an Abbe number of the third lens element, and $V_4$ is an Abbe number of the fourth lens element.

10. The optical lens assembly for image taking according to claim 4, wherein the optical lens assembly for image taking satisfies the following condition:

$$0.2<CT_2/CT_1<1.0$$

wherein $CT_1$ is a central thickness of the first lens element, and $CT_2$ is a central thickness of the second lens element.

11. The optical lens assembly for image taking according to claim 4, wherein the optical lens assembly for image taking satisfies the following condition:

$$-1.1<R_1/R_2<0.7$$

wherein $R_1$ is a radius of curvature of the object-side surface of the first lens element, and $R_2$ is a radius of curvature of the image-side surface of the first lens element.

12. The optical lens assembly for image taking according to claim 2, wherein the optical lens assembly for image taking satisfies the following condition:

$$0.25<(R_5+R_6)/(R_5-R_6)<0.55$$

wherein R5 is a radius of curvature of the object-side surface of the third lens element, and R6 is a radius of curvature of the image-side surface of the third lens element.

13. The optical lens assembly for image taking according to claim 1, wherein the first lens element comprises at least one inflection point.

14. The optical lens assembly for image taking according to claim 1, wherein the optical lens assembly for image taking satisfies the following condition:

$$0.3<R_7/R_6<0.8$$

wherein $R_6$ is a radius of curvature of the image-side surface of the third lens element, and $R_7$ is a radius of curvature of the object-side surface of the fourth lens element.

15. An optical lens assembly for image taking comprising, in order from an object side to an image side:

a first lens element with negative refractive power having a concave object-side surface;
a second lens element comprising a concave object-side surface;
a third lens element with positive refractive power; and
a fourth lens element with negative refractive power having at least one of an object-side surface and an image-side surface of the fourth lens element being aspheric;
the optical lens assembly for image taking satisfying the following conditions:

$$-3.0<R_1/R_2<0.9;$$

$$|f/f_2|<0.35;$$

$$0.5<SL/TTL<0.9$$

wherein, $R_1$ is a radius of curvature of the object-side surface of the first lens element, $R_2$ is a radius of curvature of the image-side surface of the first lens element, f is a focal length of the optical lens assembly for image taking, $f_2$ is a focal length of the second lens element, the optical lens assembly for image taking further comprises a stop and an image plane; SL is an axial distance between the stop and the image plane, and TTL is an axial distance between the object-side surface of the first lens element and the image plane.

16. The optical lens assembly for image taking according to claim 15, wherein the object-side surface of the fourth lens element is concave, the image-side surface of the fourth lens element is convex, and both the object-side surface of the fourth lens element and the image-side surface of the fourth lens element are aspheric.

17. The optical lens assembly for image taking according to claim 16, wherein the image-side surface of the second lens element is convex.

18. The optical lens assembly for image taking according to claim 17, wherein the fourth lens element comprises at least one inflection point.

19. The optical lens assembly for image taking according to claim 18, wherein the optical lens assembly for image taking satisfies the following condition:

$$0.1<(R_5+R_6)/(R_5-R_6)<0.8$$

wherein $R_5$ is a radius of curvature of the object-side surface of the third lens element, and $R_6$ is a radius of curvature of the image-side surface of the third lens element.

20. The optical lens assembly for image taking according to claim 18, wherein the optical lens assembly for image taking satisfies the following condition:

$$23<V_3-V_4<45$$

wherein $V_3$ is an Abbe number of the third lens element, and $V_4$ is an Abbe number of the fourth lens element.

21. The optical lens assembly for image taking according to claim 19, wherein the optical lens assembly for image taking satisfies the following condition:

$$0.3<R_7/R_6<0.8$$

wherein $R_6$ is a radius of curvature of the image-side surface of the third lens element, and $R_7$ is a radius of curvature of the object-side surface of the fourth lens element.

22. The optical lens assembly for image taking according to claim 20, wherein the second lens element has positive refractive power.

23. The optical lens assembly for image taking according to claim 20, wherein the optical lens assembly for image taking satisfies the following condition:

$$0.25 < (R_5+R_6)/(R_5-R_6) < 0.55$$

wherein $R_5$ is a radius of curvature of the object-side surface of the third lens element, and $R_6$ is a radius of curvature of the image-side surface of the third lens element.

* * * * *